United States Patent
Watanabe et al.

(10) Patent No.: US 9,250,567 B2
(45) Date of Patent: Feb. 2, 2016

(54) DEVELOPER CONTAINER FOR DETECTING DEVELOPER AMOUNT BASED ON CAPACITANCE, DEVELOPING APPARATUS, PROCESS CARTRIDGE, AND IMAGE FORMING APPARATUS

(71) Applicant: CANON KABUSHIKI KAISHA, Tokyo (JP)

(72) Inventors: Taku Watanabe, Susono (JP); Masahito Kato, Gotemba (JP); Go Shindo, Mishima (JP); Atsushi Toda, Fuji (JP); Katsuichi Abe, Suntou-gun (JP); Motonari Ito, Suntou-gun (JP); Akira Suzuki, Naka-gun (JP); Junichi Matsumura, Numazu (JP); Naoki Matsumaru, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/322,091

(22) Filed: Jul. 2, 2014

(65) Prior Publication Data

US 2015/0016829 A1     Jan. 15, 2015

(30) Foreign Application Priority Data

| Jul. 12, 2013 | (JP) | 2013-146567 |
| Jul. 12, 2013 | (JP) | 2013-146569 |
| Sep. 24, 2013 | (JP) | 2013-197563 |
| Sep. 24, 2013 | (JP) | 2013-197570 |
| May 30, 2014 | (JP) | 2014-113492 |
| Jun. 18, 2014 | (JP) | 2014-125611 |

(51) Int. Cl.
*G03G 15/08* (2006.01)
*B29C 45/14* (2006.01)
(Continued)

(52) U.S. Cl.
CPC ...... *G03G 15/0831* (2013.01); *B29C 45/14008* (2013.01); *G03G 15/086* (2013.01);
(Continued)

(58) Field of Classification Search
CPC .................. G03G 15/0856; G03G 15/086
USPC ....................................... 399/27, 30
See application file for complete search history.

(56) References Cited

U.S. PATENT DOCUMENTS

| 5,946,522 A | 8/1999 | Inami |
| 6,397,017 B1 | 5/2002 | Sakai |

(Continued)

FOREIGN PATENT DOCUMENTS

| EP | 0 665 475 A2 | 8/1995 |
| JP | 2-283413 A | 11/1990 |

(Continued)

OTHER PUBLICATIONS

Partial European Search Report in European Application No. 14176487.8 (dated Dec. 3, 2014).

(Continued)

*Primary Examiner* — William J Royer
(74) *Attorney, Agent, or Firm* — Fitzpatrick, Cella, Harper & Scinto

(57) ABSTRACT

A developer container including a frame configured to define a developer containing portion, a first electrode, and a second electrode arranged on a surface of the frame and having a surface opposed to the first electrode, a developer amount in the developer containing portion being detected based on a capacitance between the first electrode and the second electrode.

17 Claims, 21 Drawing Sheets

(51) Int. Cl.
*G03G 21/18* (2006.01)
*B29L 31/00* (2006.01)
*B29K 507/04* (2006.01)
*B29K 25/00* (2006.01)

(52) U.S. Cl.
CPC .......... *G03G15/0894* (2013.01); *G03G 21/181* (2013.01); *G03G 21/1814* (2013.01); *B29C 2045/14155* (2013.01); *B29K 2025/06* (2013.01); *B29K 2507/04* (2013.01); *B29K 2623/083* (2013.01); *B29K 2625/06* (2013.01); *B29K 2995/0003* (2013.01); *B29K 2995/0005* (2013.01); *B29L 2031/767* (2013.01); *G03G 2215/0643* (2013.01); *G03G 2215/0888* (2013.01); *Y10T 29/49204* (2015.01)

(56) References Cited

U.S. PATENT DOCUMENTS

| | | | |
|---|---|---|---|
| 6,415,112 B1 * | 7/2002 | Kimizuka et al. | 399/27 |
| 6,512,895 B2 | 1/2003 | Sakurai et al. | |
| 6,810,217 B2 | 10/2004 | Hiratsuka et al. | |
| 6,859,627 B2 | 2/2005 | Karakama et al. | |
| 7,095,967 B2 | 8/2006 | Karakama et al. | |
| 7,532,828 B2 * | 5/2009 | Komiya et al. | 399/27 |
| 7,630,655 B2 | 12/2009 | Namiki et al. | |
| 2002/0025174 A1 | 2/2002 | Sakurai et al. | |
| 2003/0016955 A1 | 1/2003 | Hiratsuka et al. | |

FOREIGN PATENT DOCUMENTS

| | | |
|---|---|---|
| JP | 8-15975 A | 1/1996 |
| JP | 9-190067 A | 7/1997 |
| JP | 2000-250380 A | 9/2000 |
| JP | 2001-51489 A | 2/2001 |
| JP | 2001-117346 A | 4/2001 |
| JP | 2002-040906 A | 2/2002 |
| JP | 2003-248371 A | 9/2003 |
| JP | 2007-264612 A | 10/2007 |
| JP | 4794751 B2 | 10/2011 |
| JP | 2012-168241 A | 9/2012 |
| WO | 2011/038703 A1 | 4/2011 |

OTHER PUBLICATIONS

Extended European Search Report in European Application No. 14176487.8 (issued May 28, 2015).

* cited by examiner

- S101 START PRINTING IMAGE
- S102 MEASURE CAPACITANCE
- S103 OBTAIN CURRENT REMAINING AMOUNT OF TONER WITH REFERENCE TO DATA TABLE
- S104 INFORM USER OF OBTAINED REMAINING AMOUNT OF TONER

CLOSEST POINT A AND
END PORTION B

REMAINING AMOUNT OF TONER

DEVELOPER CONTAINER FOR DETECTING DEVELOPER AMOUNT BASED ON CAPACITANCE, DEVELOPING APPARATUS, PROCESS CARTRIDGE, AND IMAGE FORMING APPARATUS

BACKGROUND OF THE INVENTION

1. Field of the Invention

The present invention relates to a method of manufacturing a developer container to be used in an image forming apparatus such as a copying machine, a printer, and a facsimile machine of an electrophotographic printing method or an electrostatic recording process, and to a developer container, a developing apparatus, a process cartridge, and an image forming apparatus.

2. Description of the Related Art

Electrophotographic image forming apparatus, for example, are hitherto provided with a developing apparatus configured to form a developer image by supplying a developer to an electrostatic latent image formed on an electrophotographic photosensitive member (photosensitive member) as an image bearing member. In recent years, developing cartridges or process cartridges are widely used which include the developing apparatus alone or along with other process means and which are detachably mountable to the main body of the image forming apparatus.

A cartridge method in which a developing cartridge or a process cartridge (The developing cartridge or the process cartridge may hereinafter simply be referred to as "cartridge".) is detachably mountable to the main body of an image forming apparatus facilitates the supplying of the developer and other types of maintenance work.

For the cartridge method, in general, an operator such as a user or a service person replaces the cartridge or supplies the developer at the time the developer in a developer container of the developing apparatus is used up, thereby enabling the image forming apparatus to form images again. It is therefore common for an image forming apparatus of the cartridge method to have detecting means for detecting the amount (remaining amount) of the developer in order to detect the consumption of the developer and inform the user or others of when to replace the cartridge.

A type of the detecting means is one that uses a capacitance detection method in which, as disclosed in Japanese Patent Application Laid-Open No. 2001-117346, the developer amount is detected by providing a pair of an input-side electrode and an output-side electrode to measure the capacitance between the electrodes. The electrodes are in general antenna members which are made of metal and shaped into a plate (SUS sheet metal or the like).

Japanese Patent Application Laid-Open No. 2003-248371 discloses another example in which a developer carrying member in a developing apparatus that applies an AC voltage to the developer carrying member serves as the input-side electrode and a capacitance detecting member serving as the output-side electrode is arranged in the developing apparatus so as to face the developer carrying member. This capacitance detecting member also is in general an antenna member which is made of metal and shaped into a plate (SUS sheet metal or the like).

The capacitance between the electrodes (between the antenna members, or between the developer carrying member and the antenna member) in the capacitance detection method varies depending on the amount of the developer which is constituted of an insulating toner and others. Specifically, the capacitance between the electrodes is large when the space between the electrodes is filled with the developer, and decreases as the developer dwindles and air takes up the space between the electrodes at an increasing ratio. Accordingly, the developer amount can be detected by obtaining the relation of the developer amount to the capacitance between the electrodes in advance and measuring the capacitance.

However, using the electrode plates described above, such as SUS sheet metal, for the antenna members tends to increase the cost of parts relatively. Consequently, increasing the antenna members in size or number in order to, for example, improve the precision of developer amount detection or accomplish successive detection of the remaining developer amount from an earlier stage at the start of use is likely to increase the cost of the developer container and other components.

Japanese Patent Application Laid-Open No. 2002-40906 discloses, as a method of fixing the antenna members, a method that uses a double-sided adhesive tape to stick the antenna members to a frame that forms a developer container of a developing apparatus. Japanese Patent Application Laid-Open No. 2002-40906 also discloses that, as an alternative, a conductive paint layer or vapor deposition layer may be formed directly on the frame by performing printing or evaporation directly on the frame, or a conductive portion may be formed by the two-color molding of conductive resin, but does not disclose a detailed description of the alternative.

Japanese Patent Application Laid-Open No. H08-15975 discloses a method of forming an electrode layer by applying a coating solution in which an appropriate amount of fine carbon black particles is dispersed in a blend solution of a urethane resin and a vinyl chloride resin to a sheet base and thermally curing the applied coat.

However, the methods described above which involve sticking the antenna members to the frame with double-sided adhesive tape or forming the antenna members on the frame by evaporation or printing tend to complicate the manufacturing steps for reasons including the need for a step of processing the frame after the forming of the frame.

SUMMARY OF THE INVENTION

The present invention has been made in view of the above, and the present invention therefore provides a method of manufacturing easily a developer container whose developer amount is detected by the capacitance detection method.

The present invention provides a developer container, a developing apparatus, and a process cartridge which improves the precision of developer amount detection by the capacitance detection method when conductive resin members are used for electrodes.

In view of the above, according to an embodiment of the present invention, there is provided a method of manufacturing a developer container including a frame configured to define a developer containing portion, a first electrode, a second electrode which is arranged on a surface of the frame and which has a surface opposed to the first electrode, a developer amount in the developer containing portion being detected based on a capacitance between the first electrode and the second electrode, the method comprising: holding a conductive resin member constituting the second electrode on a mold configured to mold the frame, a surface of the conductive resin member being in contact with a surface of the mold, the surface of the mold being configured to mold a surface of the frame on a side of the developer containing portion; injecting a resin to be formed into the frame, into the mold on which the conductive resin member is held; and curing the resin to form the frame to which the second electrode constituted by the conductive resin member is fixed.

Further, according to another embodiment of the present invention, there is provided a developer container configured to contain a developer, the developer container comprising an antenna member configured to detect a developer amount by use of a capacitance, wherein the antenna member comprises a conductive resin member having a resistance of $10^3 \Omega$ or more and $10^5 \Omega$ or less.

Further, according to still another embodiment of the present invention, there is provided a developer container, comprising: a frame configured to define a developer containing portion; a first electrode; and a second electrode which is arranged on a surface of the frame and which has a surface opposed to the first electrode, wherein a developer amount in the developer containing portion is detected based on a capacitance between the first electrode and the second electrode, the second electrode is constituted by a conductive resin member, a closest point, in which the second electrode is closest to the first electrode, on the second electrode is located in a position other than an end portion of the second electrode as viewed along an axial direction of the first electrode, the second electrode has at least one convex portion protruding toward the first electrode, and the closest point is located on the at least one convex portion.

Further, according to yet still another embodiment of the present invention, there are provided a developing apparatus, a process cartridge, and an image forming apparatus including the above-mentioned developer container.

Further features of the present invention will become apparent from the following description of exemplary embodiments with reference to the attached drawings.

DESCRIPTION OF THE EMBODIMENTS

A developer container manufacturing method, a developer container, a developing apparatus, a process cartridge, and an image forming apparatus according to the present invention will be described in more detail below with reference to the drawings.

First Embodiment

I. Overall Configuration and Operation of an Image Forming Apparatus

Figure 1:
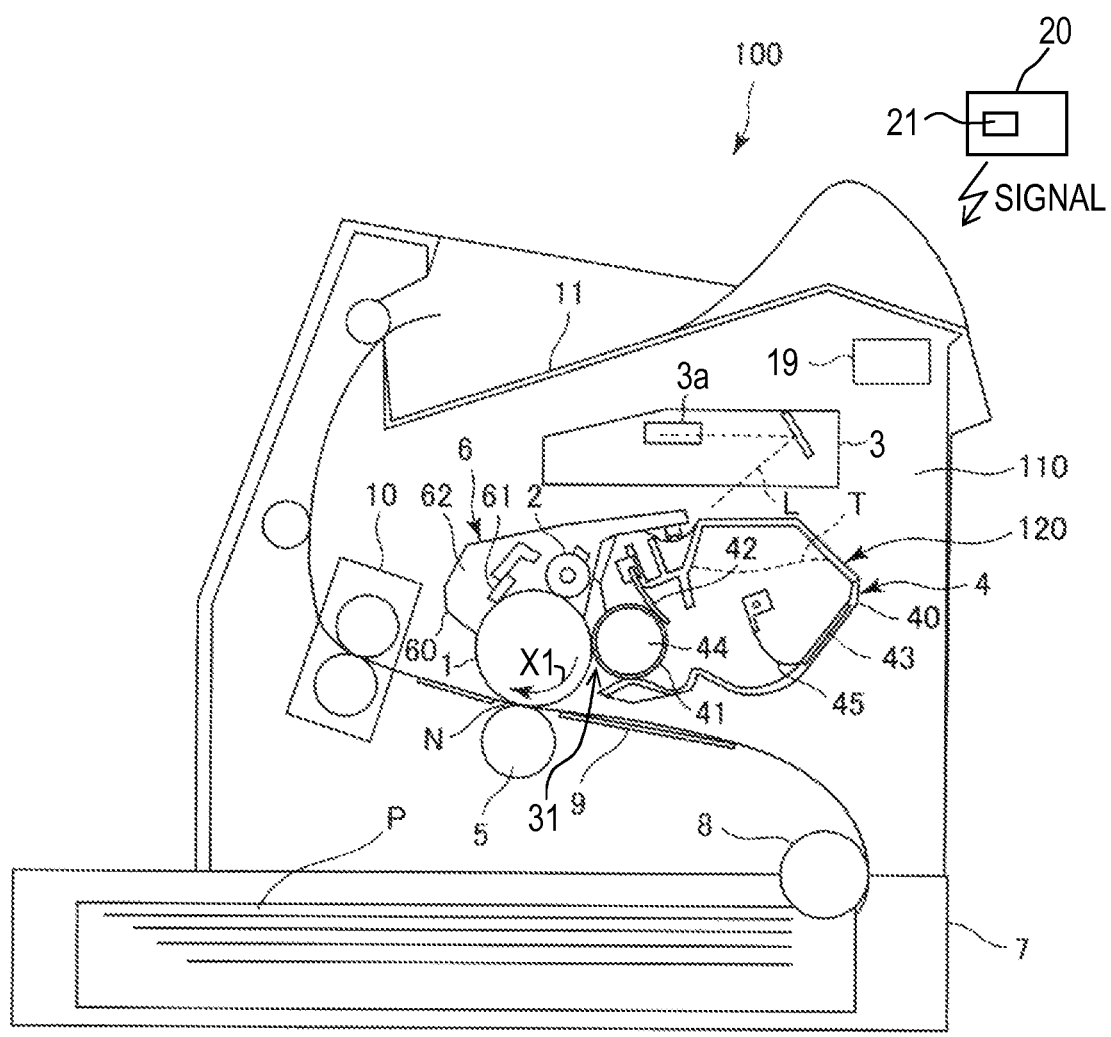
FIG. 1 is a schematic sectional view of an image forming apparatus according to a first embodiment.

FIG. 1 is a schematic sectional view of an image forming apparatus according to a first embodiment of the present invention. The image forming apparatus of the embodiment which is denoted by 100 is a laser beam printer configured to form an image by the electrophotographic printing method. The image forming apparatus 100 employs the cartridge method, and includes a process cartridge 120 which is detachably mountable to an apparatus main body 110.

An external host device such as a personal computer or an image reading device is connected to the image forming apparatus 100. The image forming apparatus 100 receives image information from the host device, forms an image according to the image information on a recording material (a recording medium or a transfer material), and outputs (prints) the image. A sheet material such as paper is preferred as the recording material.

The image forming apparatus 100 has, as an image bearing member, a photosensitive drum 1 which is a drum-shaped (cylindrical) electrophotographic photosensitive member (photosensitive member). The following means are arranged around the photosensitive drum 1 in order along the rotation direction of the photosensitive drum 1. First, a charging roller 2 which is a roller-shaped charging member is arranged to serve as charging means. Next, an exposure device (laser scanner unit) 3 is arranged to serve as exposure means. A developing apparatus 4 which serves as developing means follows next. A transfer roller 5 which is a roller-shaped transfer member is arranged next to serve as transfer means. A cleaning device 6 which serves as cleaning means follows next.

When a print start signal is input to the image forming apparatus 100 and image formation is started, a rotational driving force is transmitted to the photosensitive drum 1 from a drive motor (not shown) which is provided in the apparatus main body 110 to serve as driving means. The photosensitive drum 1 is thus driven to rotate in a direction indicated by an arrow X1 of FIG. 1 at a predetermined peripheral velocity (process speed), for example, 147.6 mm/s. The photosensitive drum 1 in the embodiment includes a drum base made of aluminum and an OPC photosensitive layer provided on the drum base. The charging roller 2 is arranged so as to be in contact with the photosensitive drum 1, and rotates in association with the rotation of the photosensitive drum 1. A surface (circumferential surface) of the rotating photosensitive drum 1 is charged by the charging roller 2 substantially uniformly to a predetermined electric potential of a predetermined polarity (the negative polarity in the embodiment). During the charging, a predetermined charging bias (charging voltage) is applied to the charging roller 2 from a charging power source (high-voltage power source) (not shown) which is provided in the apparatus main body 110. In the embodiment, an oscillation voltage created by superimposing an AC voltage Vpp of 1.6 kV (frequency: 1,600 Hz), which causes the charging roller 2 to discharge sufficiently, on a DC voltage Vdc of −560 V, which corresponds to a dark section potential Vd on the photosensitive drum 1, is applied as the charging bias. The AC component of the charging bias is controlled by constant-current control so that a substantially constant current flows between the photosensitive drum 1 and the charging roller 2.

The charged surface of the photosensitive drum 1 is exposed to laser light L which is emitted from the exposure device 3 in accordance with the image information. The exposure device 3 outputs, from a laser output portion 3a, the laser light (exposure light) L modulated according to time-series electric digital image signals of the image information, which is input from a personal computer 20 or the like to a video controller 19. The laser light L output from the exposure device 3 enters the interior of the process cartridge 120 and irradiates the surface of the photosensitive drum 1. The substantially uniformly charged surface of the photosensitive drum 1 is scanned with and exposed to the laser light L, with the result that an electrostatic latent image (electrostatic image) according to the image information is formed on the surface of the photosensitive drum 1. In the embodiment, a bright section potential V1 on the photosensitive drum 1 irradiated with the laser light L is −130 V. An image part of the electrostatic latent image is exposed (an image exposure method) in the embodiment.

The electrostatic latent image formed on the surface of the photosensitive drum 1 is developed by the developing apparatus 4 with the use of a toner T as a developer. Details of the developing apparatus 4 will be described later.

Meanwhile, a pickup roller 8 as conveying means is driven at predetermined control timing to feed sheets of recording material P such as recording paper stacked on a recording material tray 7, which serves as a recording material containing portion, one sheet at a time. The recording material P is thus conveyed to a transfer portion N by conveying means (not shown) at the predetermined control timing. The transfer roller 5 is brought into contact with the surface of the photosensitive drum 1 at a predetermined pressing force to form the transfer portion (transfer nip) N. The recording material P is conveyed to the transfer portion N via a transfer guide 9, which serves as a guide member. While the recording material P nipped by the photosensitive drum 1 and the transfer roller 5 is being conveyed through the transfer portion N, the toner image on the surface of the photosensitive drum 1 is transferred electrostatically to a surface of the recording material P. At this point, a transfer bias (transfer voltage) which is a DC voltage having a polarity opposite to the toner charging polarity (the negative polarity in the embodiment) for developing is applied to the transfer roller 5 from a transfer power source (high voltage power source) (not shown) provided in the apparatus main body 110.

The recording material P on which the toner image has been transferred is separated from the photosensitive drum 1 and conveyed to a fixing device 10, which is provided downstream of the transfer portion N in the direction of conveyance of the recording material P and which serves as fixing means. The recording material P receives toner image fixing processing in the fixing device 10 through heating and pressurizing. The fixing device 10 in the embodiment includes a heating roller which contains a halogen heater inside and a pressure roller which is pressed against the heating roller. The fixing device 10 heats and pressurizes the toner image transferred onto the surface of the recording material P while the recording material P is being held and conveyed between the heating roller and the pressure roller which form a fixing nip. The toner image is thus fused and fixed on the surface of the recording material P. The recording material P is then discharged onto a discharge tray 11, which is provided on an upper part of the apparatus main body 110 in FIG. 1.

The surface of the photosensitive drum 1 after the recording material P is separated is cleaned by the cleaning device 6 to be subjected repeatedly to the image forming process described above which starts with the charging. The cleaning device 6 uses a cleaning blade 61, which is a cleaning member arranged so as to abut against the photosensitive drum 1, to remove extraneous matter such as a residual toner remaining after transfer from the surface of the rotating photosensitive drum 1, and collects the extraneous matter in a collected toner container 62.

II. Process Cartridge

Figure 2:
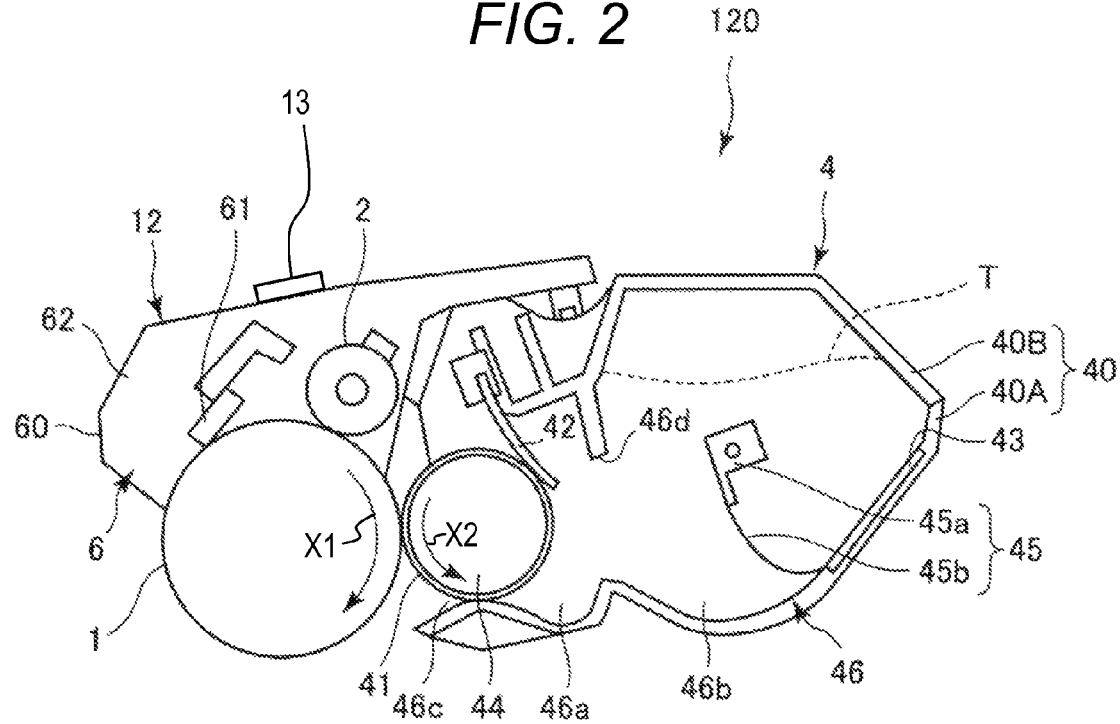
FIG. 2 is a schematic sectional view of a process cartridge according to the first embodiment.

FIG. 2 is a schematic sectional view of the process cartridge 120. In the embodiment, the photosensitive drum 1 and the process means for acting on the photosensitive drum 1, namely, the charging roller 2, the developing apparatus 4, and the cleaning device 6, are integrally made into a cartridge to form the process cartridge 120 which is detachably mountable to the apparatus main body 110.

The process cartridge 120 is constructed by coupling a cleaning unit 12 and a developing unit (developing apparatus) 4 which is a separate unit from the cleaning unit 12.

The cleaning unit 12 includes the photosensitive drum 1, the charging roller 2, and the cleaning device 6. The cleaning unit 12 also has a cleaning frame 60 which forms the collected toner container 62 and supports the photosensitive drum 1, the charging roller 2, and the cleaning blade 61. Details of the developing unit 4 will be described later.

Process cartridges in general are defined as a cartridge which integrally includes an image bearing member such as a photosensitive member and process means for acting on the image bearing member, and which is detachably mountable to the apparatus main body of an image forming apparatus. The process means include, for example, charging means, developing means, cleaning means, and toner charging means for charging a residual toner remaining after transfer. The process cartridge here is a cartridge which integrally includes at least a developer container or a developing apparatus and an image bearing member, and which is detachably mountable to the apparatus main body of an image forming apparatus.

III. Developing Apparatus

Figure 3:
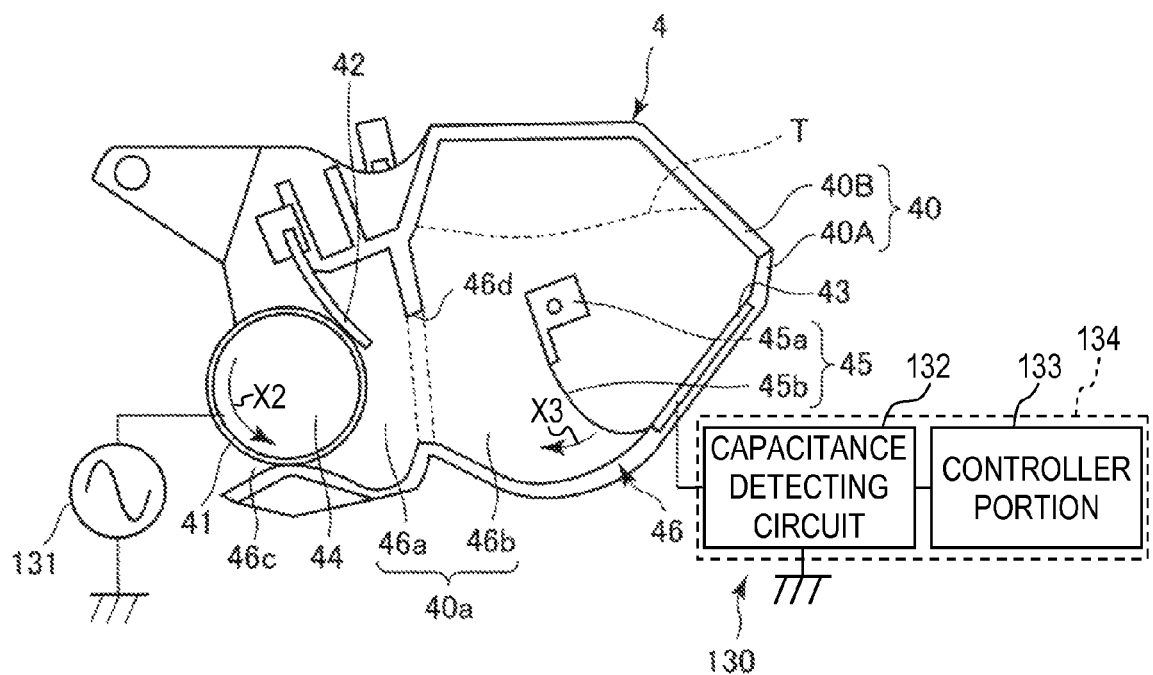
FIG. 3 is a schematic sectional view of a developing apparatus according to the first embodiment.

FIG. 3 is a schematic sectional view of the developing apparatus 4 in the embodiment. FIG. 3 also schematically illustrates function blocks which constitute a detecting device 130, which will be described later.

The developing apparatus 4 of the embodiment has a developing frame 40 which forms a developer container 46 configured to contain a magnetic single-component developer (toner) T as a developer, and which supports components described later. The developer container 46 includes a developing chamber 46a and a toner chamber 46b. In the embodiment, the developing chamber 46a and the toner chamber 46b which are formed from the developing frame 40 and which can contain the toner T constitute a developer containing portion 40a.

A developing sleeve 41 is arranged in the developing chamber 46a so as to be partially exposed to the outside of the developing chamber 46a from an opening 46c, which is formed in the developing chamber 46a on the side of the photosensitive drum 1. The developing sleeve 41 is a cylindrical member formed from a nonmagnetic material as a developer carrying member. The developing sleeve 41 is supported by the developing frame 40 in a manner that allows the developing sleeve 41 to rotate. The developing sleeve 41 faces the photosensitive drum 1 across a predetermined gap. A rotational driving force is transmitted to the developing sleeve 41 from the drive motor (not shown) which is provided in the apparatus main body 110 to drive and rotate the developing sleeve 41 in a direction indicated by an arrow X2 of FIG. 3. A magnet roller 44 which has a plurality of magnetic poles in the circumferential direction is arranged in the hollow portion of the developing sleeve 41 to serve as magnetic field generating means. The magnet roller 44 is supported by the developing frame 40 in a fixed manner (irrotationally). A developing blade 42 which is a regulating member formed from an elastic material to serve as developer layer regulating means is arranged in the developing chamber 46a so as to abut against the circumferential surface of the developing sleeve 41. The developing blade 42 is supported by the developing frame 40.

In the toner chamber 46b, an agitating member 45 is arranged as developer agitating means. The agitating member 45 includes a support rod 45a and an agitating sheet 45b which is fixed to the support rod 45a. The support rod 45a is supported by the developing frame 40 in a manner that allows the support rod 45a to rotate. A rotational driving force is transmitted to the agitating member 45 from the drive motor (not shown) which is provided in the apparatus main body 110 to drive and rotate the agitating member 45 in a direction indicated by an arrow X3 of FIG. 3. With the rotational driving of the agitating member 45, the toner T contained in the toner chamber 46b is conveyed from the toner chamber 46b to the developing chamber 46a through a toner supply opening 46d, which is an opening for communication between the developing chamber 46a and the toner chamber 46b.

Figure 16:
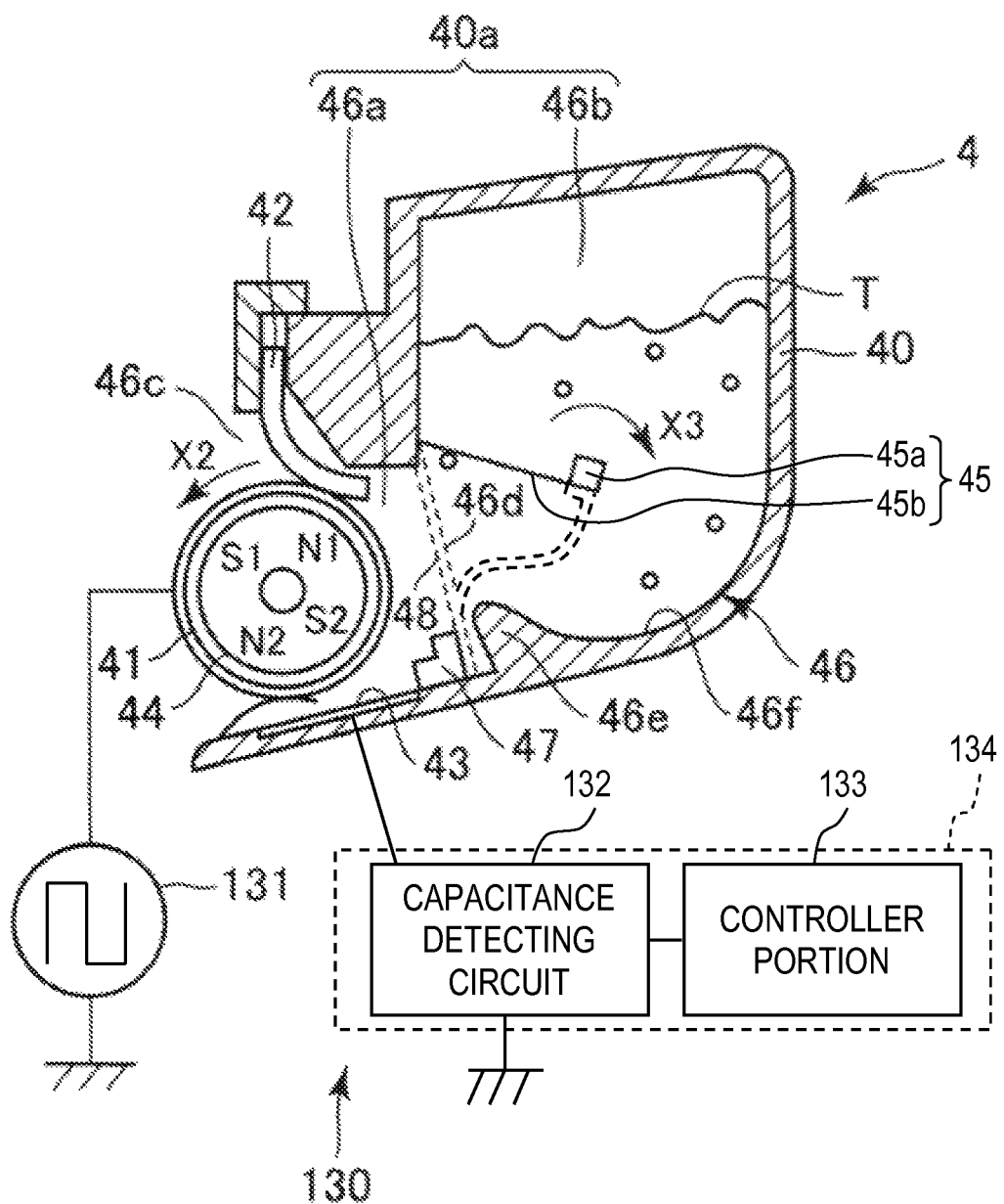
FIG. 16 is a schematic sectional view of a developing apparatus according to a third embodiment.

The toner supply opening 46d is closed (sealed) by a sealing member 48 (see FIG. 16) in order to prevent toner leakage during the shipping of the process cartridge 120. The sealing member 48 is present for toner leakage prevention until the process cartridge 120 starts to be used. The sealing member 48 may be removed manually or may be removed automatically by providing a seal breaking member in the toner chamber 46b or the developing chamber 46a and driving the seal breaking member so that the sealing member 48 is rolled up and out of the way, or otherwise removed. The seal breaking member may double as an agitating member. For instance, in the case of an agitating member that includes an agitating shaft and an agitating sheet member, the agitating sheet member may double as a toner sealing member while the agitating shaft is given the function of the seal breaking member. Alternatively, a toner sealing member may be attached to the agitating shaft separately from the agitating sheet member (FIG. 16). As for the electrodes configured to detect the developer amount, if the sealing member rotates and agitates while holding in the developer, a certain level of capacitance is detected between the electrodes despite the fact that there is no developer that can be used to form an image. This may be prevented by opening a hole in other parts of the toner sealing member than the toner sealing portion so that the developer caught in the rotating toner sealing member drops down to the bottom of the container. The toner T is contained only in the toner chamber 46b out of the developing chamber 46a and the toner chamber 46b until the sealing member 48 is removed (FIG. 3).

An antenna member 43 which constitutes the detecting device 130 described later is arranged on a part of the bottom of the toner chamber 46b.

The toner T conveyed to the developing chamber 46a is attracted to the developing sleeve 41 by the magnetic force of the magnet roller 44 contained in the developing sleeve 41, and is conveyed by the rotation of the developing sleeve 41 to the abutment portion where the developing blade 42 and the developing sleeve 41 abut against each other (FIG. 3). By passing through the abutment portion where the developing blade 42 and the developing sleeve 41 abut against each other, the toner T is electrically charged by friction (triboelectricity) and is also regulated in toner layer thickness. Thereafter, the toner T is conveyed to a developing area 31 (FIG. 1) where the photosensitive drum 1 and the developing sleeve 41 face each other.

A predetermined developing bias (developing voltage) is applied to the developing sleeve 41 from a developing power source (high voltage power source) which is provided in the apparatus main body 110 to serve as voltage applying means.

The developing bias applied in the embodiment is an oscillation voltage created by superimposing a DC voltage (for example, Vdc=−400 V) on an AC voltage (for example, peak-to-peak voltage=1,500 Vpp, frequency f=2,400 Hz). The photosensitive drum 1 is electrically grounded. An electric field is thus generated in the developing area 31 where the photosensitive drum 1 and the developing sleeve 41 face each other. The action of the electric field causes the toner T conveyed to the developing area 31 to transfer to the surface of the photosensitive drum 1 in accordance with an electrostatic latent image on the surface of the photosensitive drum 1. The electrostatic latent image on the photosensitive drum 1 is developed with the toner T as a result. In the embodiment, an electrostatic latent image is developed by adhering the toner T which is charged to the same polarity as the charge polarity of the photosensitive drum 1 (the negative polarity) to an exposed part (image part) on the photosensitive drum 1 which has been uniformly charged and then exposed to light to be thereby decayed in the absolute value of the electric potential (a reversal development method).

While the description of the embodiment uses an example in which an electrostatic latent image is developed with a magnetic single-component developer (toner) charged to a negative polarity, a nonmagnetic developer or a two-component developer may be used instead. The developer may also be charged to a positive polarity instead of a negative polarity in developing.

IV. Detecting Device

A description will be provided of the detecting device (developer amount detecting device) 130 which uses the capacitance detection method and which serves as detecting means (developer amount detecting means) for detecting the amount of developer in the embodiment.

The detecting device 130 of the embodiment includes the developing sleeve 41 as a first electrode, the antenna member 43 as a second electrode, a developing power source 131, a capacitance detecting circuit 132, a controller portion 133, and the like. The antenna member 43 is arranged on a surface of the developing frame 40 and has a surface opposed to the developing sleeve 41. The antenna member 43 in the embodiment is formed on a flat surface portion for the ease of manufacturing. The amount of the toner T in the developer containing portion 40a is determined based on the capacitance between the developing sleeve 41 and the antenna member 43. The capacitance detecting circuit 132 and the controller portion 133 together constitute a remaining developer amount detecting device (toner remaining amount detecting device) 134. A more detailed description will be provided below.

In the embodiment, the developing sleeve 41 doubles as the first electrode (input-side electrode) configured to detect the capacitance. The antenna member 43 which is a capacitance detecting member is provided as the second electrode (output-side electrode or opposite electrode) configured to detect the capacitance. The antenna member 43 in the embodiment is constituted by a conductive resin sheet which is a conductive resin member. The antenna member 43 has a part that is rectangular in plan view and that has a predetermined length in the longitudinal direction, which is substantially parallel to the longitudinal direction (rotation axis direction) of the developing sleeve 41, and a predetermined length in the lateral direction, which intersects (substantially orthogonal in the embodiment) the longitudinal direction of the antenna member 43. The rectangular part is a measurement part which forms the surface opposed to the developing sleeve 41 in the embodiment. The antenna member 43 may have a part configured to form a conductive path and other parts in addition to the measurement part configured to form the surface that is opposed to the developing sleeve 41. For instance, the part configured to form a conductive path may be formed at an end portion of the rectangular measurement part in the longitudinal direction in a continuous manner as a single sheet. The conductive resin sheet is, as described in detail later, a sheet-shaped member of a monolayer structure or a multi-layer structure which is resin-based and is conductive. The antenna member 43 is arranged on a part of the bottom of the toner chamber 46b formed by the developing frame 40 so that changes can be detected in the amount of the toner T between a surface of the antenna member 43 which is opposed to the developing sleeve 41 and the developing sleeve 41. The antenna member 43 in the embodiment is flat.

When an AC voltage (AC bias) is applied to the developing sleeve 41, a current which is determined in relation to the capacitance between the developing sleeve 41 and the antenna member 43 is induced between the two. The capacitance varies depending on the amount of the toner T between the developing sleeve 41 and the antenna member 43. Specifically, the detected capacitance is large when the amount of the toner T between the electrodes is large, because a relative permittivity of the toner T is larger than a relative permittivity of the air. The value of the current flowing into the antenna member 43 is measured, via a contact point (not shown) provided in the process cartridge 120 and a contact point (not shown) provided in the apparatus main body 110, by the capacitance detecting circuit 132 which is provided in the apparatus main body 110. In the embodiment, the capacitance detecting circuit 132 generates a voltage signal in relation to this current value (namely, capacitance value) and inputs the voltage signal to the controller portion 133 provided in the apparatus main body 110. The controller portion 133 can obtain the amount of the toner T from the input voltage signal based on information (a data table or the like) indicating a relation between the capacitance and the amount of the toner T which is set in advance.

Based on the obtained amount of the toner T, the controller portion 133 can inform a user of information related to the amount of the toner T by displaying the information on a display portion of the apparatus main body 110 which serves as informing means, a monitor of the personal computer connected to the apparatus main body 110. The user is thus prompted to prepare a new process cartridge 120.

Figure 4:
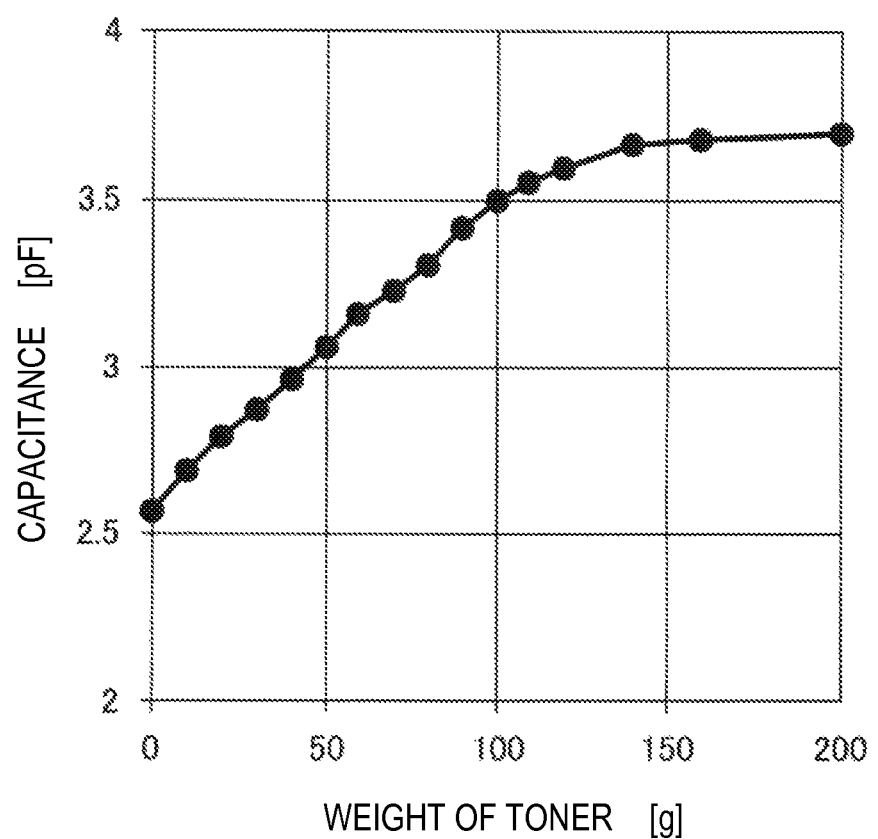
FIG. 4 is a graph showing a relation between the toner amount and the capacitance in the first embodiment.

FIG. 4 is a graph showing a relation between the amount of the toner T in the developer containing portion 40a and the capacitance in the embodiment. In the embodiment, the antenna member 43 is provided on the bottom of the toner chamber 46b, and a change in the amount of the toner T between the developing sleeve 41 and the antenna member 43 is detected. Detected in the embodiment are changes in the amount of the toner T from a time point where the toner T has been consumed some and the amount of the toner T in the developer containing portion 40a is around 150 g to the depletion of the toner T. The image forming apparatus 100 of the embodiment can thus notify the user or others of the amount (remaining amount) of the toner T sequentially during this period. The detection range of the remaining amount of the toner T varies depending on the arrangement of the antenna member 43, and the antenna member 43 may therefore be arranged in any desired place. The antenna member 43 may be arranged in the toner chamber 46b or in the developing chamber 46a.

The length in the longitudinal direction of the antenna member 43 in the embodiment is substantially the same as the extent of an image area (a direction substantially orthogonal to an image conveying direction). This is because, even when the amount of the toner T is uneven in the longitudinal direction, the detection precision is improved by detecting the capacitance in a wide range which includes the uneven part. The length in the longitudinal direction of the antenna member 43 may therefore be longer than the extent of the image area. However, if so desired, the antenna member 43 having the length which is shorter in the longitudinal direction than the extent of the image area may be arranged in, for example, the central portion of the image area or around an end portion of the image area. This applies, for example, when it is acceptable in terms of detection precision, when the agitating member 45 prevents unevenness in the amount of the toner T in the longitudinal direction, and when the unevenness in the amount of the toner T in the longitudinal direction (or a defect in the image due to the unevenness) itself is detected by the capacitance detection method. Alternatively, a plurality of conductive resin members of different lengths may be provided in the longitudinal direction of the developing sleeve 41 so that an uneven toner distribution or the toner amount is detected by detecting a plurality of differences or differentials in capacitance between the developing sleeve 41 and the conductive resin members. Instead of the plurality of conductive resin members of different lengths, a component whose length in the lateral direction (width) gradually decreases from one end to the other end in the longitudinal direction may be used to detect differences in capacitance.

The length in the lateral direction of the antenna member 43 may be longer or shorter than the one in the embodiment. For example, in the case of detecting the remaining amount of the toner T in a wider range, the length in the lateral direction of the antenna member 43 may be set longer than in the embodiment. The antenna member 43 in this case is not limited to the bottom of the toner chamber 46b and may cover an arbitrary stretch of the surface of the developing frame 40. To give another example, in the case of detecting with high precision the remaining amount of the toner T in a particular range such as immediately before the depletion of the toner T, the antenna member 43 may have the length in the lateral direction set shorter than in the embodiment so as to be closer to the developing sleeve 41.

In the embodiment, the developing sleeve 41 serves as an AC voltage input portion (input-side electrode) configured to detect the amount of the toner T because an AC voltage is applied to the developing sleeve 41 in image forming, and the antenna member 43 serves as an output portion (output-side electrode) for the detection. The developing frame 40 in the embodiment therefore has a holding portion configured to hold the developing sleeve 41. The AC voltage input portion is not limited to the developing sleeve 41, and can be any conductive member. The developing frame 40 in this case has a holding portion configured to hold the conductive member. Alternatively, the electrode constituted by a conductive resin sheet may serve as the AC voltage input portion (input-side electrode). In this case, an AC voltage is applied from an AC voltage source via the contact point provided in the process cartridge 120 and the contact point provided in the apparatus main body 110 to the electrode constituted by a conductive resin sheet.

Figure 13:
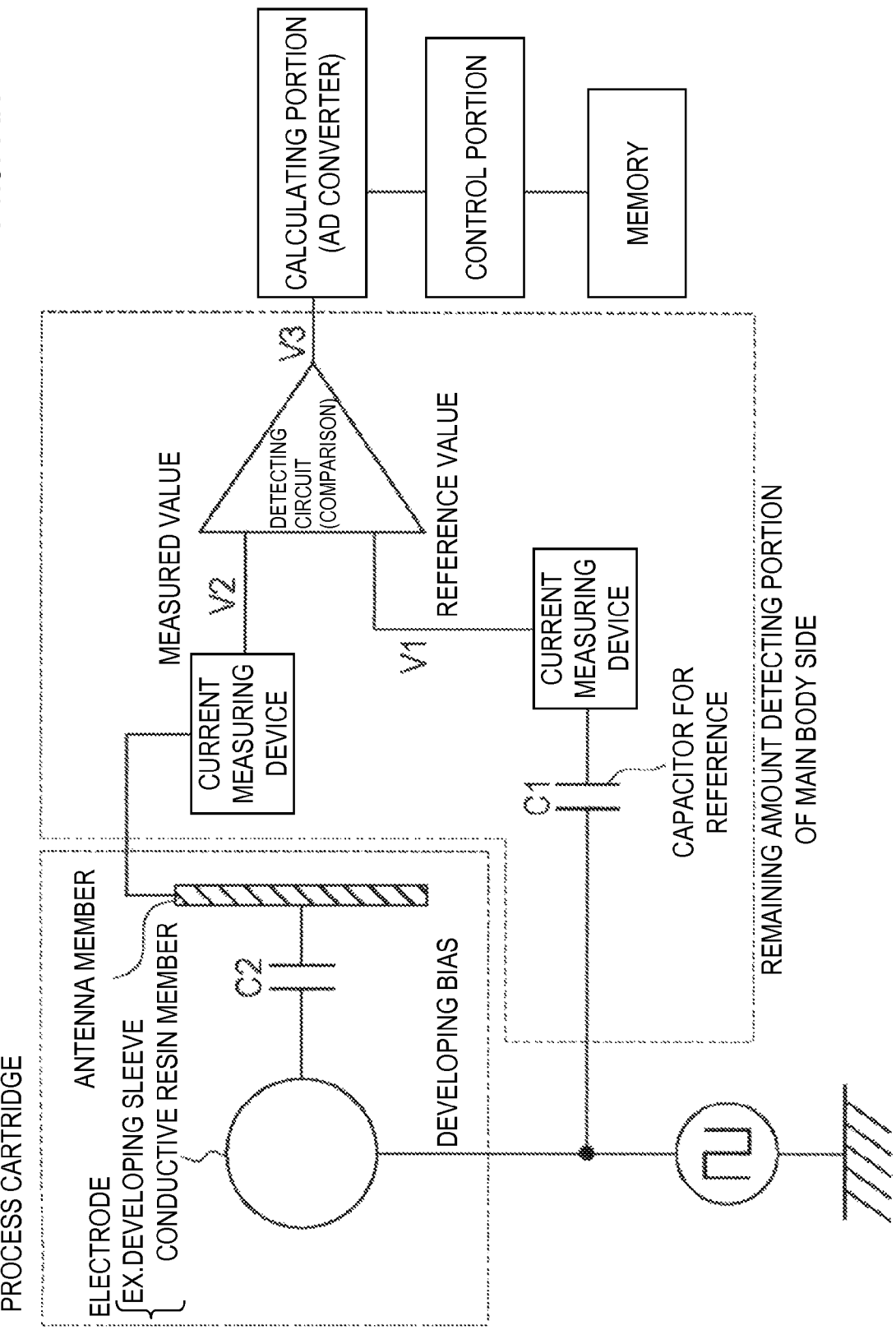
FIG. 13 is a schematic diagram of a toner remaining amount detecting circuit.

The detecting device described in the embodiment detects the capacitance between the developing sleeve 41 and the electrode. However, the present invention is not limited thereto and both of the paired electrodes may be conductive resin members. In other words, the developer amount may be detected from a difference in capacitance between the conductive resin members (FIG. 13). The present invention in this case can also be applied to the remaining toner amount detection for a nonmagnetic toner which is used in a full-color image forming apparatus to which a plurality of cartridges are detachably mountable.

V. Manufacturing Method

A method of manufacturing the developer container 46 in the embodiment will be described next.

As mentioned above, methods that have been used to manufacture a developing container of which the developer amount is detected by the capacitance detection method include ones in which an antenna member is stuck to a frame with double-sided adhesive tape, or deposited on the frame by evaporation, or printed on the frame. However, such methods require a step of performing post-processing on the frame after the frame is formed and accordingly tend to complicate the manufacturing steps. In addition, the method that uses double-sided adhesive tape to stick the antenna member to the frame, for example, has a risk of low detection precision due to variations in the sizes and positions of the respective parts.

A possible alternative method is to use as an antenna member a plate-shaped metal member (such as SUS sheet metal) which is inserted to a resin-made frame when the frame is molded. This method, however, presents difficulties in design because the molded resin shrinks significantly when cooled whereas the plate-shaped metal member does not contract much, which easily leads to the distortion of the resultant container. The method also requires providing a location where the antenna member and the frame are fixed to each other (a fixing portion or a fixing shape). For example, the method requires preventing the antenna member from moving by molding the frame so that the fixing portion of the frame covers an end surface and both surfaces of the antenna member at an end portion in the longitudinal direction of the antenna member. This means that the frame itself needs to be thick and that the frame tends to be large because the frame is likely to have a complicated shape with surface irregularities in a location where the mold and the frame are fixed. Moreover, this method does not make full use of the performance of the plate-shaped member because the fixing portion configured to fix the antenna member which has a shape with surface irregularities turns what is originally an area where a change in developer amount causes a change in capacitance into an area where the capacitance does not change.

Using a resin electrode (conductive portion) as the electrode configured to detect capacitance, on the other hand, is advantageous in terms of manufacturing process simplification and detection precision improvement because the electrode can easily and precisely be molded by a relatively simple method that uses a mold. As described later, using a resin electrode is also advantageous in that the cost of the electrode itself is reduced and in that a drop in detection precision due to a magnetic developer clinging to the electrode is prevented.

For example, it is conceivable to form a conductive portion on the frame from a conductive resin by two-color molding. This method, however, requires a molding step twice and therefore still has room for improvement for simpler manufacturing. With a method in which the electrode layer is provided on a sheet member as described above for preventing the developer from scattering, the manufacturing steps tend to be complicated because of a step of attaching the sheet member to the frame of the developing apparatus.

Thus, a simple way to manufacture a developer container of which the developer amount is detected by the capacitance detection method is demanded. A manufacturing method that accomplishes high-precision detection of the developer amount is also sought after.

The embodiment addresses the issue by, prior to the molding of the developing frame 40, first holding a conductive resin sheet from which the antenna member 43 is constructed in a mold and then injecting a resin (synthetic resin) to be formed into the developing frame 40, into the mold. The developing frame 40 to which the antenna member 43 is integrally fixed is molded in this manner. A more detailed description thereof will be provided below.

Figure 6A:
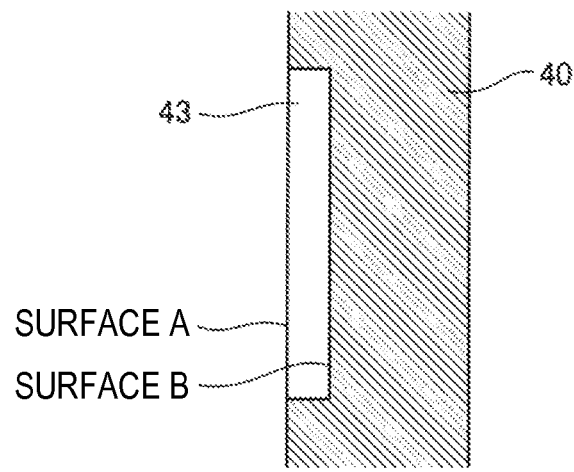
FIGS. 6A and 6B are sectional views of a part of the developing frame in the vicinity of an antenna member according to the first embodiment.
Figure 6B:
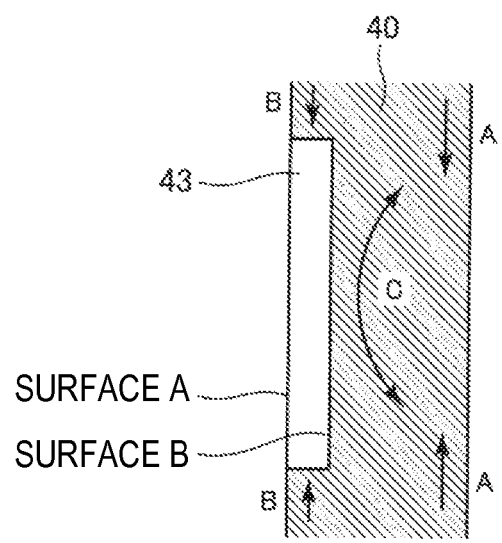

The embodiment uses as a conductive resin sheet 24 a polystyrene (PS) resin sheet on one surface of which is coated with a conductive material, specifically, carbon, to have conductivity. The surface of the conductive resin sheet 24 which is coated with carbon is referred to as surface A (FIGS. 6A and 6B). A surface of the conductive resin sheet 24 which is opposite to the surface A and where the PS resin is exposed is referred to as a surface B. The surface A of the conductive resin sheet 24 is brought into contact with the mold when the developing frame 40 is molded in the embodiment. In this manner, at least a part of (in the embodiment, substantially the entirety of) the surface of the conductive resin sheet 24 which is brought into contact with the mold is a surface of the antenna member 43 opposed to the developing sleeve 41. At least the surface B of the conductive resin sheet 24 is brought into contact with the resin injected into the mold when the developing frame 40 is molded in the embodiment. In the embodiment, a PS resin is exposed also on a side end surface between the surface A and the surface B, and the side end surface is also brought into contact with the resin injected into the mold when the developing frame 40 is molded.

FIGS. 5A, 5B, 5C, and 5D schematically illustrate steps of manufacturing the developing frame 40 in the embodiment. The developing frame 40 may be constructed by coupling a plurality of frame parts which have been molded. The developing frame 40 in the embodiment is constructed by coupling a lower frame 40A, which forms the bottom of the developer containing portion 40a, and an upper frame 40B, which is put on the lower frame 40A like a lid, as illustrated in FIG. 3. The lower frame 40A and the upper frame 40B are molded separately from each other. The antenna member 43 in the embodiment is arranged in the lower frame 40A, and FIGS. 5A to 5D therefore schematically illustrate lower frame manufacturing steps (hereinafter the lower frame 40A may simply be referred to as "developing frame 40").

Figure 5A:
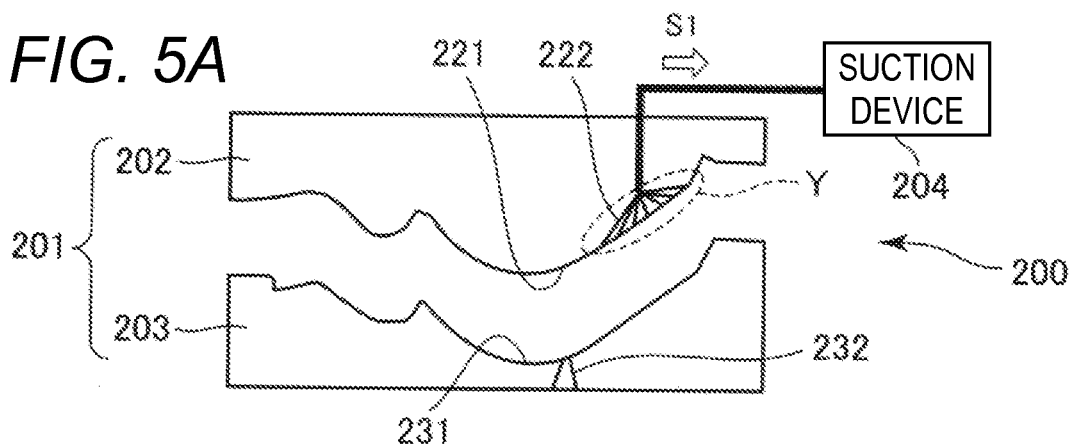
FIGS. 5A, 5B, 5C, and 5D are schematic views illustrating steps of manufacturing a developing frame according to the first embodiment.

As illustrated in FIG. 5A, a mold 201 of an injection molding machine 200 has a first mold 202 (or a male mold (core)) and a second mold 203 (or a female mold (cavity)). The first mold 202 has a surface 221 for forming the containing portion-side surface of the developing frame 40. The second mold 203 has a surface 231 for forming a surface of the developing frame 40 which is opposite to the developer containing portion 40a (the outer surface of the developing frame 40). Minute air holes (air suction portions) 222 are provided in a predetermined holding area Y of the first mold 202, the holding area Y being used for holding the conductive resin sheet 24. A suction device 204 is connected to the minute air holes 222 to suction air in a direction indicated by an arrow S1 of FIG. 5A. The second mold 203 is provided with a gate 232.

Figure 5B:
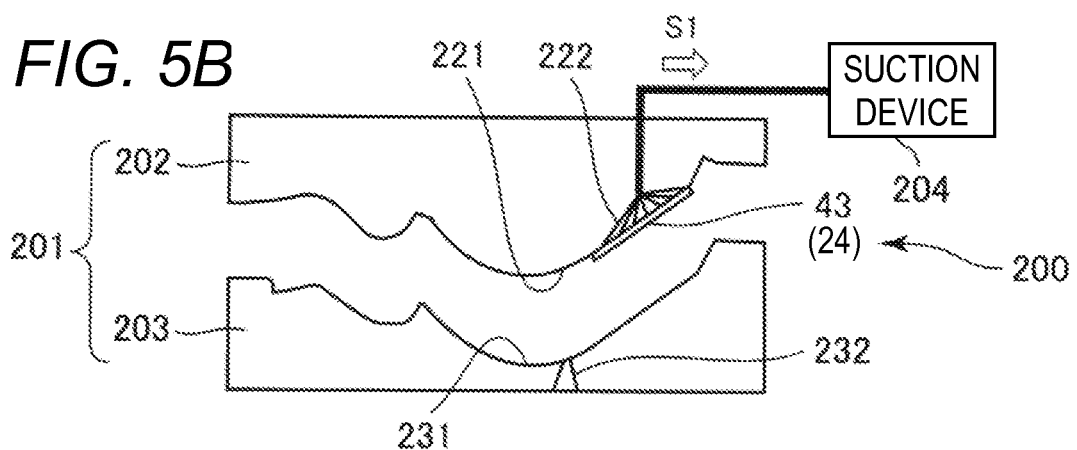

To mold the developing frame 40 with the injection molding machine 200, the conductive resin sheet 24 is first arranged in the holding area Y so that the surface A of the conductive resin sheet 24 is in contact with the surface 221 of the first mold 202 as illustrated in FIG. 5B, and air suction by the suction device 204 is put into operation. The surface A of the conductive resin sheet 24 is suctioned and held onto the surface 221 of the first mold 202 in this manner.

Figure 5C:
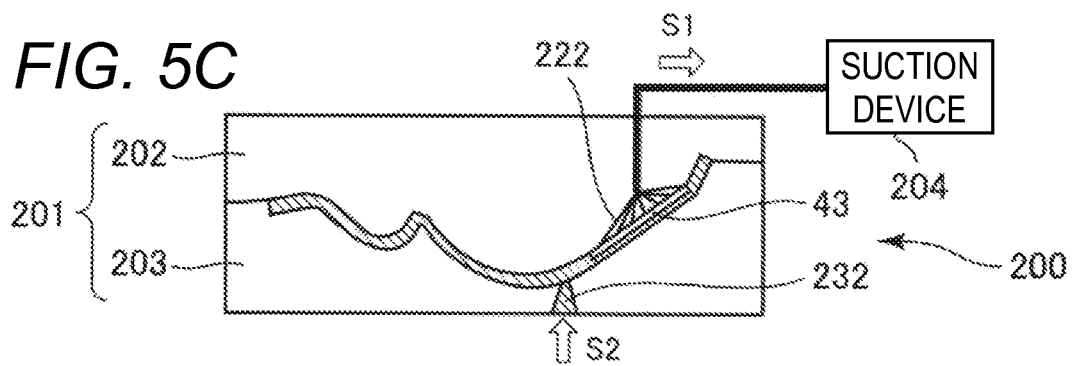

Thereafter, as illustrated in FIG. 5C, the first mold 202 and the second mold 203 are closely pressed to each other with a desired pressurizing force to create a cavity portion where the developing frame 40 is formed. A thermoplastic resin for forming the developing frame 40 is injected from the gate 232 in a direction indicated by an arrow S2 in FIG. 5C. The injected thermoplastic resin is cooled to be cured (solidified), thereby forming the developing frame 40 to which the antenna member 43 constituted by a conductive resin sheet is integrally fixed. As the thermoplastic resin injected into the mold 201, the embodiment uses a high impact polystyrene (HIPS) resin which has compatibility with at least the surface B (and the side end surface as well in the embodiment) of the conductive resin sheet 24. By injecting and curing the resin into the mold 201, the antenna member 43 constituted by a conductive resin sheet is molded integrally with the developing frame 40.

Figure 5D:

Thereafter, air suction by the suction device 204 is stopped and the developing frame 40 to which the antenna member 43 has integrally been fixed can be taken out of the mold 201 as illustrated in FIG. 5D.

The lower frame 40A molded in the manner described above is coupled to the separately molded upper frame 40B by any suitable fixing method such as thermal welding. The developer container 46 formed from the developing frame 40 can thus be manufactured. The developing sleeve 41 and other components of the developing apparatus 4 described above are attached to (held by) the developer container 46 before and/or after the upper frame 40B and the lower frame 40A are coupled, to thereby manufacture the developing apparatus (developing unit) 4. The cleaning unit 12 described above is coupled to (held by) the developing apparatus (developing unit) 4, to thereby manufacture the process cartridge 120.

In the embodiment, a metal contact point is pressed against a conductive portion (not shown) at an end portion of the developing frame 40 in which the antenna member 43 is integrally molded. A conductive member which is connected to, or continued from, the contact point on one end is led out and laid around the process cartridge 120 so that the other end of the conductive member serves as a point of contact with the apparatus main body 110. Consequently, a current flowing in the antenna member 43 when an AC voltage is applied to the developing sleeve 41 during image forming is detected by the capacitance detecting circuit 132, which is provided in the apparatus main body 110, as described above.

VI. Effects

According to the embodiment, the developing frame 40 in which the antenna member 43 is integrally molded can be manufactured by a simple method having fewer steps in which the conductive resin sheet 24 is held by suction to the mold 201 (the first mold 202) in advance when the developing frame 40 is molded.

FIG. 6A is a sectional view of a part of the developing frame 40 which is in the vicinity of the antenna member 43 at the center in the longitudinal direction of the antenna member 43 (a section along the lateral direction of the antenna member 43). As described above, in the embodiment, at least the surface B (and the side end surface as well in the embodiment) of the conductive resin sheet 24 has compatibility with the thermoplastic resin injected into the mold 201. Accordingly, at least the surface B (and the side end surface as well in the embodiment) of the conductive resin sheet 24 is integrated with a thermoplastic resin injected into the mold in the molding of the developing frame 40. The formed developing frame 40 is therefore already one with which the antenna member 43 is integrated, and there is no need to further process the developing frame 40 into a special shape configured to fix the antenna member 43.

The capacitance value is known to change in proportion to the reciprocal number of the distance between two electrodes. This is not an issue in the embodiment where the conductive resin sheet 24 is held during the molding so that the surface A of the conductive resin sheet 24 which is a surface opposed to the developing sleeve 41 is in contact with the surface of the mold 201 (the first mold 202). This substantially prevents variations in the position of the surface A due to, for example, variations in the thickness of the conductive resin sheet 24 and the way the conductive resin sheet 24 is fixed. With variations in the distance between the two electrodes thus prevented, capacitance variations are reduced and high-precision detection of the amount of the toner T is accomplished.

According to the embodiment, the entirety of the surface B of the conductive resin sheet 24 is substantially uniformly and integrally fixed to the developing frame 40. The embodiment is therefore free from the partly falling off of the antenna member 43 due to the distortion of the developer container 46 which is caused when, for example, an external force is applied temporarily, and from the resultant reduction in the precision of the detection of the amount of the toner T.

The embodiment uses suction via air suction as a method of holding the conductive resin sheet 24 onto the mold 201. However, the present invention is not limited thereto, and, for example, electrostatic force, magnetic force, gravity, or any other binding force may be used as long as the conductive resin sheet 24 can be held onto the mold 201 in a desired place. For instance, the conductive resin sheet 24 may be held by use of grease. However, holding by air suction is preferred for the reason that it is easily carried out without needing special materials and other reasons. While substantially the entirety of the conductive resin sheet 24 is suctioned by air suction in the embodiment, providing the air holes 222 in at least a part of the mold surface in contact with the conductive resin sheet 24 which is closer to the gate 232 helps in preventing the positional gap of the conductive resin sheet 24 during resin injection into the mold 201.

The conductive resin sheet 24 in the embodiment has, at least on the side of the developing frame 40 (the frame side), a surface constituted by a material which has compatibility with the thermoplastic resin injected into the mold 201 when the developing frame 40 is molded (the surface B and the side end surface in the embodiment). Compatibility in general means a property in which two or more different substances have affinity with one another and mix practically homogeneously without inducing a chemical reaction to form a solution or a mixture. Compatibility here means a property in which a material can be fixed to the developing frame 40 by dissolution or mixing that takes place in at least a part of the boundary between the material and the resin injected into the mold 201 under conditions (temperature, time, and the like) logical for the developing frame molding method described above. The same material as the resin injected into the mold 201, or a different material that has this property, is a material that has compatibility. However, the present invention is not limited thereto and the conductive resin sheet 24 may have, at least on the side of the developing frame 40, a surface constituted by a material which has adhesiveness to the resin injected into the mold 201 when the developing frame 40 is molded. Adhesiveness in general means a property in which two surfaces are bonded to each other by one of or both of a chemical force and a physical force. Adhesiveness here means a property in which a material is fixed to the developing frame 40 by other actions than in the case of materials that have the compatibility described above, in the boundary between the material and the resin injected into the mold 201 under conditions (temperature, time, and the like) logical for the developing frame molding method described above. The conductive resin sheet 24 here only needs to include a material which has compatibility with or adhesiveness to the injected resin, and there is no need to strictly discern which of compatibility and adhesiveness is at work in fixing the conductive resin sheet 24 to the developing frame 40.

In the case where the resin injected into the mold 201 is an HIPS resin, for instance, examples of materials which are compatible with the resin include a PS resin, an HIPS resin, and a PS resin dispersed with carbon and an HIPS resin dispersed with carbon which are obtained by dispersing, for example, carbon black as a conductive material in a PS resin and an HIPS resin, respectively. Examples of materials which are not compatible with but are adhesive to the HIPS resin injected into the mold 201 include an ethylene vinyl acetate (EVA) resin and EVA dispersed with carbon in which, for example, carbon black is dispersed as a conductive material.

The surface of the conductive resin sheet 24 which has compatibility with or adhesiveness to the resin injected into the mold 201 does not always need to be the entirety of the surface of the conductive resin sheet 24 which is on the side of the developing frame 40 (in the embodiment, substantially the entirety of the surface B and substantially the entirety of the side end surface). The conductive resin sheet 24 may have neither of compatibility and adhesiveness in a part of its surface on the side of the developing frame 40 as long as the antenna member 43 is fixed well to the developing frame 40. From the viewpoint of better prevention of the falling of the antenna member 43 off the developing frame 40, however, it is preferred for the surface B of the conductive resin sheet 24 which is opposite to the surface A (the surface opposed to the other electrode) of the conductive resin sheet 24 to be compatible with or adhesive to the resin injected into the mold 201. In this case, the surface B can be partially compatible or adhesive but, more desirably, has compatibility or adhesive substantially throughout.

The conductive resin sheet 24 may be conductive on one of or both of the surface A and the surface B. The conductive resin sheet 24 can have any structure that has (in the case of the output-side electrode) or that can establish (in the case of the input-side electrode) electrical connection between the conductive portion of the antenna member 43 and the capacitance detecting circuit 132 when installed as the antenna member 43 in the developing frame 40. The conductive resin sheet 24 installed as the antenna member 43 in the developing frame 40 only needs to have a level of conductivity which is sufficient as an electrode configured to detect the developer amount by the capacitance detection method. The conductive resin sheet 24 which has a two-layer structure including a conductive layer in the embodiment may therefore have a three-layer structure that includes at least one conductive layer. The conductive resin sheet 24 is not limited to a sheet-shaped member which has a synthetic resin-based multilayer structure, and may be a synthetic resin-based, monolayer, sheet-shaped member which has conductivity. For example, the conductive resin sheet 24 can be a conductive sheet-shaped member which is formed from a resin in which carbon black is dispersed as a conductive material. The resin (base) which is the base of this conductive resin sheet 24 has compatibility with or adhesiveness to the resin which is injected into the mold 201 when the developing frame 40 is molded. The conductive resin sheet 24 thus has compatibility with or adhesiveness to the resin which is injected into the mold 201 when the developing frame 40 is molded, at least on the side of the developing frame 40 (usually the entirety).

Figure 12A:
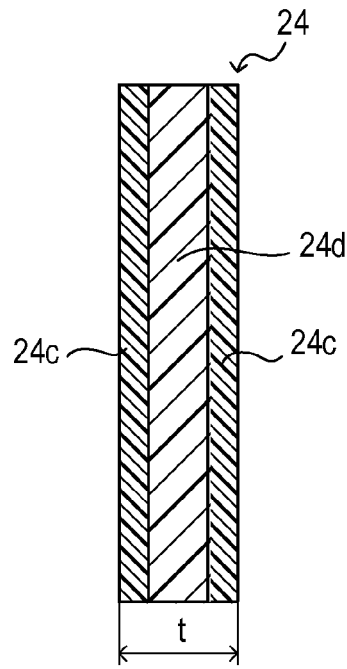
FIGS. 12A, 12B, and 12C are schematic views each illustrating an example of a conductive resin sheet.
Figure 12B:
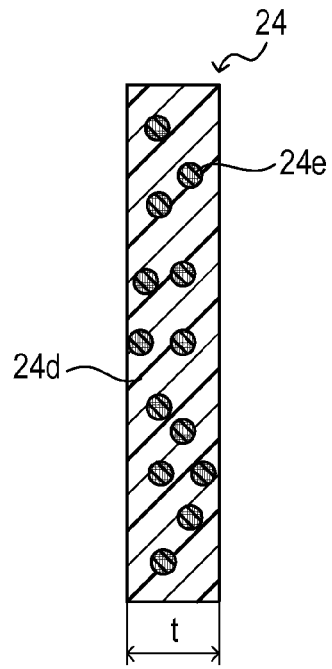
Figure 12C:
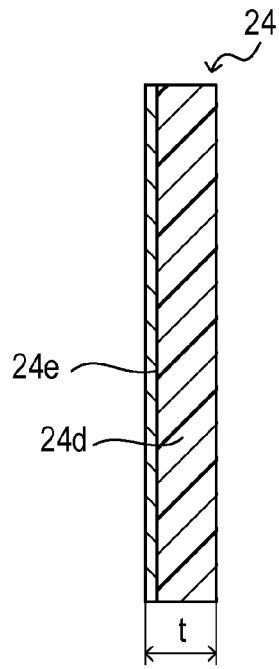

The conductive resin sheet 24 having a multilayer structure which is a sheet-shaped member made of a PS resin with a carbon coat in the embodiment is not limited thereto. For example, the conductive resin sheet 24 can be a resin-made, sheet-shaped member which is coated with other conductive substances than carbon, or a resin-made, sheet-shaped member on which a conductive substance is deposited by evaporation or printed. The conductive resin sheet 24 can also have a two-layer structure in which a protective layer configured to prevent nicks is formed on a surface of a conductive sheet-shaped member, or a three-layer structure in which a PS resin base is sandwiched between conductive layers which are obtained by dispersing a conductive material such as black carbon in a PS resin. Also in these cases, similarly to the embodiment, the resin-made sheet member (base) is formed from a material which has compatibility with or adhesiveness to the resin which is injected into the mold 201 when the developing frame 40 is molded (FIGS. 12A, 12B, and 12C).

It is preferred for the conductive resin sheet 24 to be constituted by a nonmagnetic or diamagnetic sheet-shaped member so that, when a magnetic toner is used, the toner T which is a magnetic substance does not cling to the conductive resin sheet 24.

The conductive material is not limited to carbon black, and any material which gives conductivity to the conductive resin sheet 24, such as graphite, a carbon fiber, or a carbon nanotube, can be used.

VII. Shrinking of Conductive Resin Sheet

The developing frame 40 shrinks when molded or after removed from the mold 201. When shrinking, the developing frame 40 sometimes warps if the Young's modulus of the conductive resin sheet 24 is larger than the Young's modulus of the HIPS resin forming the developing frame 40 which is 3.5 GPa. If this phenomenon changes the distance between the antenna member 43 constituted by the conductive resin sheet 24 and the developing sleeve 41 more than acceptable, it is conceivable that the precision drops in the detection of the amount of the toner T.

The warping of the developing frame 40 is a phenomenon which is caused by the shrinking of the developing frame 40, which takes place at the time of the molding of the developing frame 40 or after the removal of the developing frame 40 from the mold 201, in the case where the conductive resin sheet 24 used is greater in Young's modulus than a material that forms the developing frame 40. In other words, the shrinking of the developing frame 40 at the time of molding or after removal from the mold 201 is accompanied by the shrinking of the conductive resin sheet 24. However, in the case where the conductive resin sheet 24 is greater in Young's modulus than the material of the developing frame 40 and there is a difference in the amount of shrinkage between the developing frame 40 and the conductive resin sheet 24, the conductive resin sheet 24 cannot absorb, by distortion or the like, the shrinkage of the developing frame 40. For instance, when the developing frame 40 shrinks in directions indicated by arrows A of FIG. 6B (a direction running along the lateral direction of the conductive resin sheet 24), shrinking occurs in directions indicated by arrows B of FIG. 6B (a direction running along the lateral direction of the conductive resin sheet 24) in the vicinity of the conductive resin sheet 24. The shrinkage in the directions of the arrows B of FIG. 6B is smaller in amount than the shrinkage in the directions of the arrows A of FIG. 6B, and it is conceivable that a phenomenon in which the developing frame 40 warps in a direction indicated by an arrow C of FIG. 6B (the side where the amount of shrinkage is larger) therefore occurs in this case. The phenomenon of the warping of the developing frame 40 did not occur when the Young's modulus of the conductive resin sheet 24 which is an EVA sheet dispersed with carbon black is set to 2.5 GPa to 3.5 GPa by changing the dispersion of carbon black. The phenomenon of the warping of the developing frame 40 did not occur also when the conductive resin sheet 24 of the embodiment is used which is a PS resin sheet coated with carbon (Young's modulus=2.5 GPa). Similarly, the phenomenon of the warping of the developing frame 40 did not occur when the conductive resin sheet 24 used is a PS resin sheet which is dispersed with carbon so as to have a Young's modulus of 3.5 GPa, and when the conductive resin sheet 24 used is an EVA sheet which is dispersed with carbon so as to have a Young's modulus of 0.2 GPa.

From these facts, the conductive resin sheet 24 whose Young's modulus is equal to or smaller than the Young's modulus of the resin forming the developing frame 40 is preferred for use in the embodiment. In short, it is preferred for the conductive resin sheet 24 to have a Young's modulus equal to or less than that of the resin forming the developing frame 40. More desirably, the conductive resin sheet 24 is smaller (for example, $1/10$ or less) in Young's modulus than the resin forming the developing frame 40 because, then, the shrinkage of the conductive resin sheet 24 follows the shrinkage of the developing frame 40 more closely. In the case where the resin forming the developing frame 40 is an HIPS resin (Young's modulus=3.5 GPa), for instance, a conductive resin sheet 24 which is an EVA sheet dispersed with carbon black (Young's modulus=0.2 GPa) or a similar sheet can be used favorably.

VIII. Comparison Between Examples and Comparative Examples

The superiority of the embodiment will be described next with the use of comparative examples. In the comparative examples, components that have functions and configurations equivalent to those of the embodiment are denoted by the same reference symbols.

Configuration of Example 1

Example 1 is as described in the first embodiment.

Configuration of Comparative Example 1

Figure 7A:
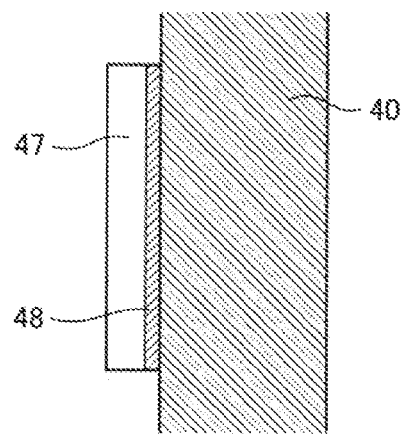
FIGS. 7A, 7B, and 7C are sectional views of parts of the developing frames in the vicinity of antenna members according to Comparative Examples 1 and 2.

FIG. 7A is a sectional view of a part of the developing frame 40 which is in the vicinity of an antenna member 47 according to Comparative Example 1 at the center in the longitudinal direction of the antenna member 47 (a section along the lateral direction of the antenna member 47). In Comparative Example 1, the antenna member 47 which is a plate-shaped member formed from stainless steel (SUS) (SUS sheet metal) is stuck to the molded developing frame 40 with double-sided adhesive tape 48. In other words, the method of manufacturing the developer container 46 according to Comparative Example 1 has a step of sticking the prepared antenna member 47 with the double-sided adhesive tape 48 to the developing frame 40 that has been molded.

Superiority of Example 1 to Comparative Example 1

Comparative Example 1 requires a step of fixing the antenna member 47 to the developing frame 40, which has been molded, by the double-sided adhesive tape 48. In contrast, the developing frame 40 in which the antenna member 43 is integrally molded is obtained in Example 1 merely by holding by suction the conductive resin sheet 24 onto the mold 201 when the developing frame 40 is molded. Example 1 accordingly needs fewer steps than Comparative Example 1 to manufacture the developing frame 40 which has the antenna member 43.

In addition, the position of the antenna member 47 in Comparative Example 1 can fluctuate because of variations in the thickness of the double-sided adhesive tape 48 and the thickness of the antenna member 47. In Example 1, on the other hand, variations in the thickness of the antenna member 43 cause practically no variations in the position of the antenna member 43 because the surface A of the antenna member (conductive resin sheet) 43 is held so as to be in contact with the mold 201. Example 1 is therefore higher in the precision of the distance between the antenna member 43 and the developing sleeve 41 than Comparative Example 1, and can detect the amount of the toner T with high precision.

Configuration of Comparative Example 2

Figure 7B:
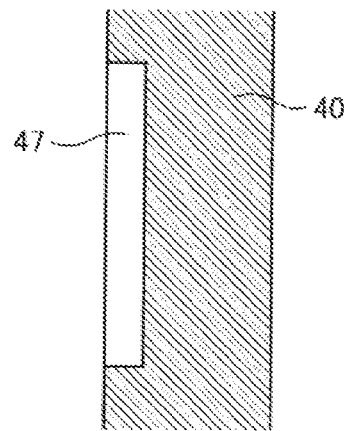
Figure 7C:
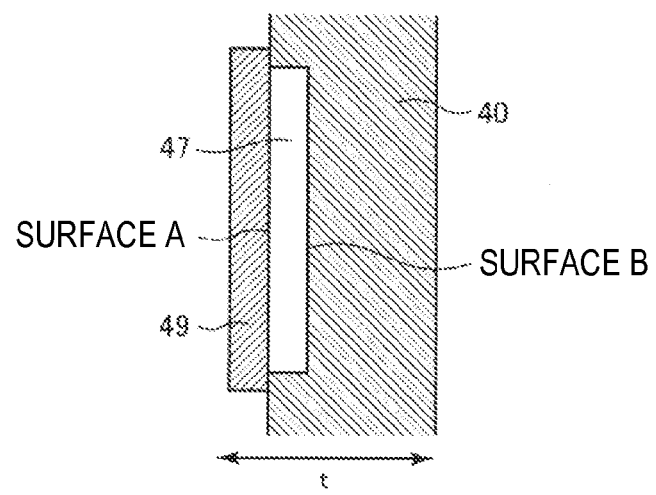

FIG. 7B is a sectional view of a part of the developing frame 40 which is in the vicinity of the antenna member 47 according to Comparative Example 2 at the center in the longitudinal direction of the antenna member 47 (a section along the lateral direction of the antenna member 47). Further, FIG. 7C is a similar diagram in an end portion in the longitudinal direction of the antenna member 47 according to Comparative Example 2. In Comparative Example 2, the antenna member 47 which is SUS sheet metal is inserted when the developing frame 40 is molded.

Comparative Example 2 does not use the double-sided adhesive tape 48 to fix the antenna member 47 as in Comparative Example 1, and the antenna member 47 in Comparative Example 2 is therefore not stuck to the resin of the developing frame 40. In Comparative Example 2, the antenna member 47 is fixed to the developing frame 40 by providing a fixing portion (or a fixing shape) 49 in a part of the developing frame 40 which is at the end portion in the longitudinal direction of the antenna member 47 as illustrated in FIG. 7C. The fixing portion 49 in Comparative Example 2 is molded so as to cover the end surface and both surfaces (the surface A and the surface B) of the antenna member 47 at the end portion in the longitudinal direction of the antenna member 47.

Superiority of Example 1 to Comparative Example 2

A thickness "t" of the developing frame 40 at the end portion in the longitudinal direction of the antenna member 47 in Comparative Example 2 is thicker than in Example 1. In addition, Comparative Example 2 involves providing the fixing portion 49 which is formed from a resin between the developing sleeve 41 and the antenna member 47. Providing the fixing portion 49 where changes in capacitance which accompany the consumption of the toner T do not take place can lower the precision in the detection of the amount of the toner T in Comparative Example 2 because the detection of the amount of the toner T using changes in capacitance is achieved by detecting changes in the capacitance between the electrodes which accompany the consumption of the toner T. In contrast, Example 1 has no need for providing a member equivalent to the fixing portion 49 and therefore has no fear of low precision in the detection of the toner T which is caused by the reason described above.

The detaching (partly falling off) of the antenna member 47 from the developing frame 40 is also a possibility with Comparative Example 2 when a change in atmospheric temperature or the application of an external force causes distortion. In Example 1, on the other hand, the antenna member (conductive resin sheet) 43, which is substantially uniformly and integrally fixed to the developing frame 40 on the surface B, does not detach from the developing frame 40. This is presumably because the force which fixes the resins to each other is strong. The distance between the developing sleeve 41 and the antenna member 43 is thus kept stable and the amount of the toner T is detected with steady precision. Accordingly, the precision in the detection of the amount of the toner T does not easily drop.

Configuration of Example 2

Example 2 is configured according to the first embodiment, but differs from Example 1 in the shape of the antenna member 43.

Figure 8:
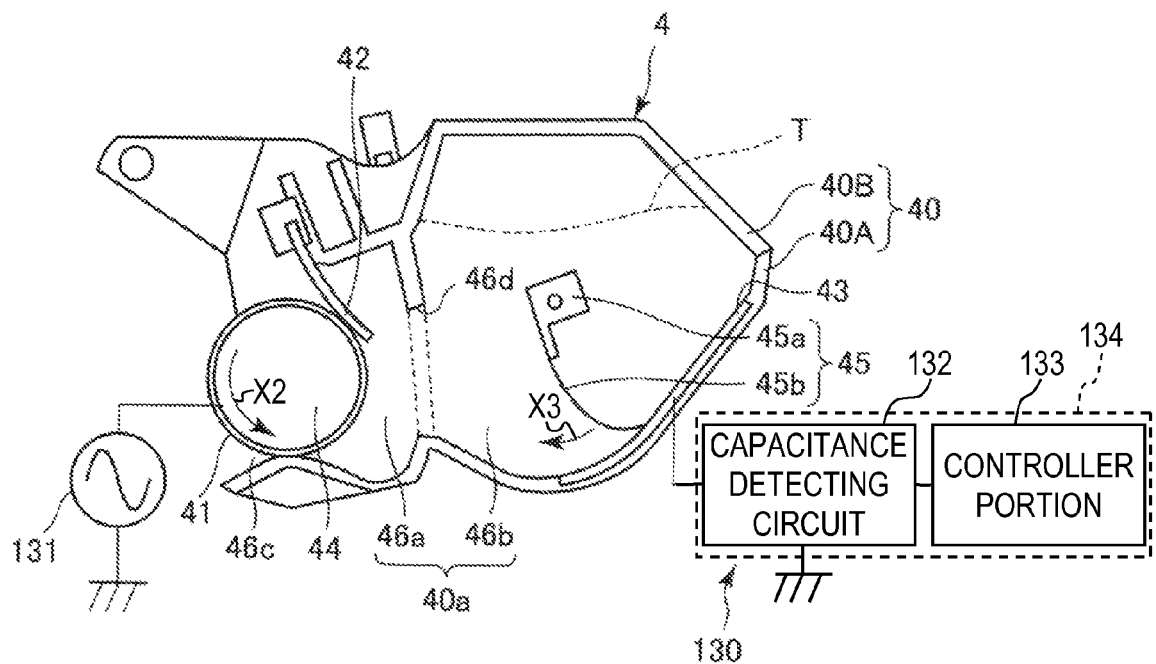
FIG. 8 is a schematic sectional view of a developing apparatus of Example 2 according to the first embodiment.

FIG. 8 is a schematic sectional view of the developing apparatus 4 according to Example 2, which is a modification example of Example 1. FIG. 8 schematically illustrates function blocks that constitute the detecting device 130 as well.

The developing frame 40 in Example 2 is not straight (flat) on the surface where the antenna member 43 is provided as illustrated in FIG. 8. However, a conductive resin sheet from which the antenna member 43 is constructed has flexibility in Example 2 and, when the developing frame 40 is molded, can therefore be held by air suction or the like to a surface of the mold 201 as in Example 1 even though the surface of the mold 201 configured to mold the developing frame 40 is curved as illustrated in FIG. 8. The conductive resin sheet can similarly be fit along the mold surface by other methods than air suction as described above. The resin sheet constituting the antenna member 43 in Example 1 can also have flexibility.

Thus, as the conductive resin sheet constituting the antenna member 43 has flexibility, the antenna member 43 can easily be arranged on a curved surface of the developing frame 40. This enables the image forming apparatus 100 to detect the remaining amount of the toner T over a wider range by, for example, arranging the antenna member 43 in a broader stretch of the curved bottom of the toner chamber 46b.

Superiority of Example 2

A case where an antenna member formed from SUS sheet metal is inserted when the developing frame 40 is molded is considered for example. The antenna member is fixed by the same method which is used in Comparative Example 2 described above. In this case, where the antenna member is formed from SUS sheet metal which does not have flexibility, SUS sheet metal is machined in advance to have a shape that fits the curved shape of a part of the developing frame 40 where the antenna member is to be arranged, and the shaped SUS sheet metal is set in a mold and subjected to insert molding. In short, this case requires machining in advance SUS sheet metal into a shape which fits the shape of the relevant part of the developing frame 40. In addition, because tolerance is set respectively in curve machining of the mold and curve machining of the SUS sheet metal, the SUS sheet metal may not fit closely to the curve of the mold, thereby creating a gap between the mold and the SUS sheet metal. This can lower the precision of the distance between the antenna member and the developing sleeve 41.

In Example 2, on the other hand, the developing frame 40 which includes the antenna member 43 can be molded merely by holding a conductive resin sheet onto a curved surface of the mold as in Example 1 without allowing the precision of the distance between the antenna member 43 and the developing sleeve 41 to drop.

Second Embodiment

A second embodiment of the present invention will be described next. In the second embodiment, components whose functions and configurations are the same as, or equivalent to, those in the first embodiment are denoted by the same reference symbols, and detailed descriptions thereof are omitted.

Described in the embodiment are electrical characteristics of a resin-made antenna member which are preferred in order to improve detection precision when the developer amount is detected by the capacitance detection method using the antenna member.

I. Developing Apparatus

Figure 9:
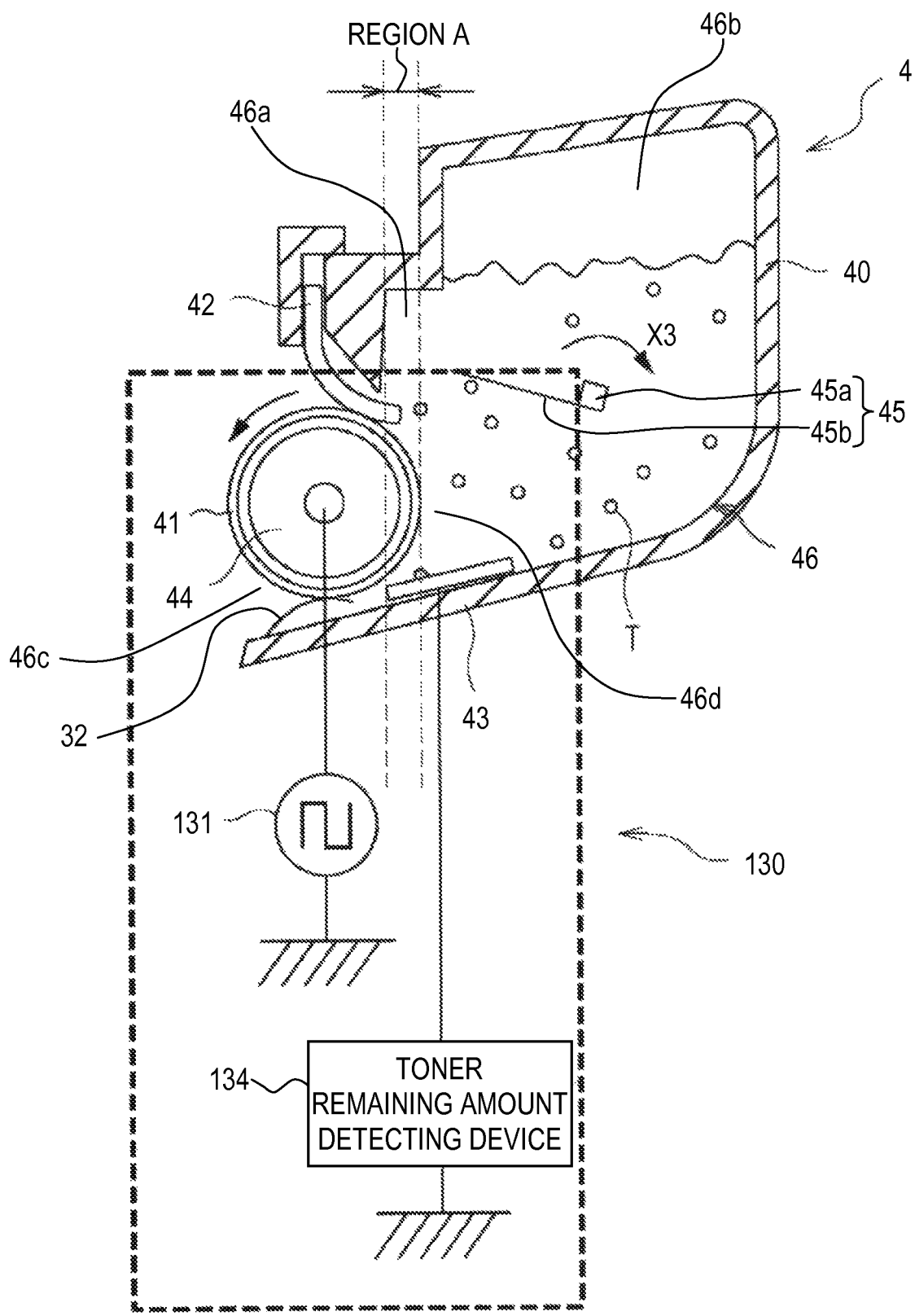
FIG. 9 is a schematic sectional view of a developing apparatus illustrating the schematic configuration of a detecting device according to a second embodiment as well.

FIG. 9 is a schematic sectional view of the developing apparatus 4 in the embodiment. The developing apparatus 4 has the developing frame 40 which forms the developer container 46 configured to contain the toner T as a developer, and which supports components described later. The toner T in the embodiment is a developer having a mean particle size of 7 μm. The developing frame 40 in the embodiment is formed from high impact polystyrene (HIPS).

The developing sleeve 41 in the embodiment is formed by coating a surface of an aluminum-made sleeve which is a nonmagnetic body with a resin layer of intermediate resistance which has a thickness of 10 μm. The volume resistance of the resin layer is approximately 1 to 10Ω.

Figure 20A:
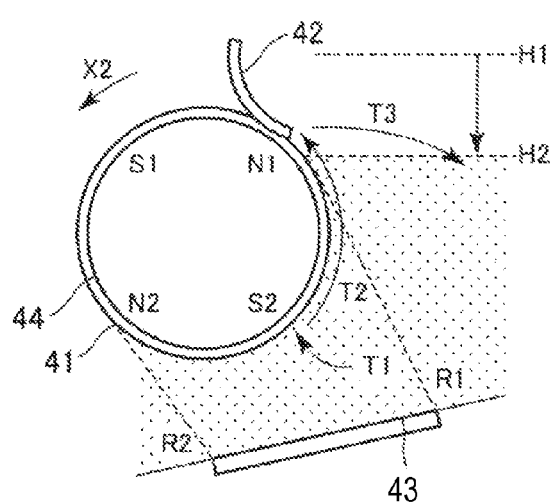
FIGS. 20A and 20B are schematic views illustrating the way of toner deposition in the developer container.
Figure 20B:
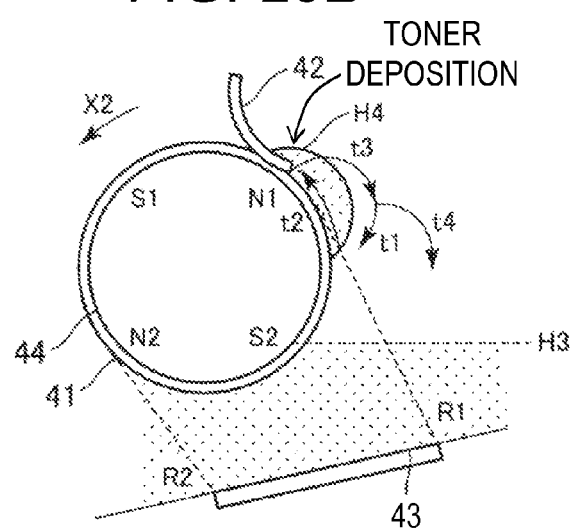

The magnet roller 44 which serves as magnetic field generating means is arranged in the cavity portion of the developing sleeve 41. The magnet roller 44 is supported by the developing frame 40 in a fixed manner (irrationally). The magnet roller 44 in the embodiment has a plurality of magnetic poles (in the embodiment, four magnetic poles denoted by S1, N1, S2, and N2) which are arranged so that N-poles and S-poles alternate in the circumferential direction (FIGS. 20A and 20B). The magnetic pole S1 is a developing pole which is arranged in a place opposed to the photosensitive drum 1 to control the development of an electrostatic latent image by the toner T. The magnetic pole N1 is a regulating pole which is arranged in a place opposed to the developing blade 42, which will be described later, to control the amount of the toner T on the developing sleeve 41. The magnetic pole S2 is a supplying pole (intake pole) which supplies the toner T in the developer container 46 onto the developing sleeve 41. The magnetic pole N2 is a toner leak preventing pole (sealing pole) which is arranged where a spouting preventing sheet 32 configured to prevent the leakage of the toner T from the developer container 46 is provided. The magnetic poles are kept in the same direction all the time because the magnet roller 44 does not rotate and is held at a fixed position all the time.

The developing blade 42 which is a regulating member is arranged in the developing chamber 46a so as to abut against the circumferential surface of the developing sleeve 41, and serves as developer layer thickness regulating means. The developing blade 42 in the embodiment is formed by fixing, by adhesion, a urethane rubber blade which is a plate-shaped member formed from an elastic material to supporting sheet metal, and the supporting sheet metal is fixed to the developing frame 40. The urethane rubber blade is thus brought into contact with the developing sleeve 41 at an appropriate abutting pressure to control the layer of the toner T on the developing sleeve 41 to a proper thickness and charge the toner layer by friction. The regulating member may be formed from a material that shields magnetism, a resin, or the like. The developing chamber 46a is also provided with the spouting preventing sheet 32 which is a sheet-shaped member configured to prevent the spouting of the toner. The spouting preventing sheet 32 abuts against the developing sleeve 41 along an edge of the opening 46c which is opposite to where the developing blade 42 is provided.

In the embodiment, the antenna member 43 constituting the detecting device 130, which will be described later, is arranged on a part of the bottom of the developing chamber 46a.

In the toner chamber 46b, on the other hand, the agitating member 45 is provided to serve as developer agitating means. The agitating member 45 includes the support rod 45a and the agitating sheet 45b, which is fixed to the support rod 45a. The support rod 45a is supported rotatably by the developing frame 40 at both end portions in the longitudinal direction of the support rod 45a (a rotation axis direction). A rotational driving force is transmitted to the agitating member 45 from the drive motor (not shown) which is provided in the apparatus main body 110 to drive and rotate the agitating member 45 in a direction indicated by an arrow X3 of FIG. 9. The support rod 45a in the embodiment rotates once in approximately one second. The agitating sheet 45b in the embodiment is a PPS sheet (a sheet-shaped member formed from a polyphenylene sulfide resin) having a thickness of 100 μm, and is fixed to the support rod 45a at one end portion in the lateral direction of the agitating sheet 45b by being press-fit or welded thereto. In the embodiment, the length in the longitudinal direction of the agitating sheet 45b is 216 mm. With the rotational driving of the agitating member 45, the toner T contained in the toner chamber 46b is conveyed from the toner chamber 46b to the developing chamber 46a through the toner supply opening 46d, which is an opening for communication between the developing chamber 46a and the toner chamber 46b.

The toner T conveyed to the developing chamber 46a reaches the vicinity of the developing sleeve 41, is attracted to the developing sleeve 41 by the magnetic pole S2 of the magnet roller 44, and is supplied to the surface of the developing sleeve 41. The toner T supplied to the developing sleeve 41 by the magnetic force of the magnetic pole S2 is conveyed by the developing sleeve 41 and regulated by the developing blade 42. At this point, the toner T passing through a regulating portion is charged by friction. An electrostatic latent image formed on the photosensitive drum 1 is developed with the toner T that has passed the regulating portion. The toner T that has been regulated by the developing blade 42, on the other hand, is divided into one which is held by the magnetic pole N1 to stay in the vicinity of the developing blade 42 and one which is flung out of the reach of the magnetic force of the magnetic pole N1. The toner T that has been flung is agitated by the agitating member 45 and then supplied to the developing sleeve 41 again in the case where the remaining amount of the toner T in the developer container 46 is large. In the case where the remaining toner amount in the developer container 46 is small, the toner T that has been flung drops vertically and lands in the vicinity of the antenna member 43. The dropped toner T is pushed out by the toner T that is moved there by the agitating member 45, without clinging to the antenna member 43. Alternatively, the dropped toner T is attracted by the magnetic force of the magnetic pole S2 to be supplied to the developing sleeve 41 again.

A predetermined developing bias (developing voltage) is applied to the developing sleeve 41 from the developing power source 131 (high voltage power source) which is provided in the apparatus main body 110 to serve as voltage applying means. The developing bias applied in the embodiment is an oscillation voltage created by superimposing a DC voltage Vdc of −400 V on an AC voltage Vpp of 1,400 V (frequency=2,000 Hz, a rectangular wave). The photosensitive drum 1 is electrically grounded. An electric field is thus generated in the developing area 31 where the photosensitive drum 1 and the developing sleeve 41 face each other.

The toner supply opening 46d is blocked (sealed) by the sealing member 48 (FIG. 16) until the sealing member 48 is removed at the time of starting using the process cartridge 120 in order to prevent toner leakage during the shipping of the process cartridge 120 or the like. The sealing member 48 in the embodiment is a PS resin sheet, and is adhered inside the developer container 46 so as not to allow the toner T to escape a region illustrated in FIG. 9 for the prevention of toner leakage in shipping or the like.

II. Detecting Device

The detecting device 130 of the embodiment will be described next. FIG. 9 is a schematic sectional view of the developing apparatus 4 that also illustrates function blocks of the detecting device 130 of the embodiment. The basic configuration and operation of the detecting device 130 in the embodiment are substantially the same as in the first embodiment.

In the embodiment, the antenna member 43 which serves as the second electrode (output-side electrode, opposite electrode) is arranged on a part of the bottom of the developing chamber 46a formed by the developing frame 40. The antenna member 43 detects a change in the amount of the toner T which is present between a surface of the antenna member 43 which is opposed to the developing sleeve 41 and the developing sleeve 41. In the embodiment, the developing sleeve 41 is used as one of the pair of electrodes as in the first embodiment, but another electrode may be provided instead of using the developing sleeve 41 as an electrode of the remaining toner amount detecting means. The degree of freedom in design about the arrangement of the electrode is higher in this case. In other words, the developer container or the developing apparatus needs at least an antenna member configured to detect the developer amount (toner amount) with the use of capacitance.

III. Regarding Antenna Member

The antenna member 43 of the embodiment is formed from a nonmagnetic or diamagnetic conductive resin sheet so that the toner which is a magnetic substance does not cling to the antenna member 43, and is arranged so as to face a vertically lower side of the developing sleeve 41. Specifically, the antenna member 43 is fixed by adhesion through insert molding to the bottom of the inner wall of the developer container 46, in the vicinity of the developing sleeve 41. The conductive sheet member constituting the antenna member 43 is provided so as to partially overlap with a part of the developing sleeve 41 in the direction of the gravity (a region A in FIG. 9) when attached to the developer container 46 in order to detect capacitance more accurate capacitance. In this configuration where the antenna member 43 is located in the vicinity of a spot below the developing sleeve 41 and the toner accordingly tends to build up on the electrode surface due to gravity, the effect brought about by using a conductive resin sheet which contains a resin in that the remaining toner amount can be measured accurately is particularly pronounced. This is because the clinging of a magnetic toner due to the magnetic force does not occur with a conductive resin sheet which contains a resin. The conductive resin sheet is provided below the developing sleeve 41 in the gravity direction in the embodiment, too. However, the antenna member 43 can be used also when the electrodes are arranged side by side in a horizontal direction with respect to the developer carrying member as disclosed in, for example, Japanese Patent Application Laid-Open No. 2007-264612. As described later in detail, the conductive resin sheet is arranged so as to come into contact with a contact point (not shown) which is located on the bottom of the developer container 46 on the near side in the drawing sheet of FIG. 9, and is connected to an earth via the toner remaining amount detecting device 134, which is provided in the apparatus main body 110.

In the configuration described above, the toner remaining amount detecting device 134 can detect the capacitance between the developing sleeve 41 and the antenna member 43 by applying bias to the developing sleeve 41 from the developing power source 131. The configuration of the embodiment performs sequential remaining amount detection in which capacitance is detected sequentially during printing.

FIGS. 12A, 12B, and 12C are sectional views of the conductive resin sheet 24. Described here are a configuration in which a carbon material is dispersed in a resin, a configuration in which resin layers including dispersed carbon material sandwich another resin layer, and a configuration in which a developer carrying member-side surface of a resin layer is coated with a carbon material.

FIG. 12A illustrates the conductive resin sheet 24 that has a three-layer structure in which a resin layer of a PS resin 24d is sandwiched between conductive layers 24c (each having a thickness of 20 μm to 40 μm) in which carbon black is mixed and dispersed in a PS resin. In this case, the conductive layers 24c are electrode portions and the conductive resin sheet 24 as a whole is an electrode. Electrical connection to the outside can be as follows. Specifically, cutting the conductive resin sheet 24 distorts and connects the conductive layers 24c of both surfaces, and an external electrical contact point is connected to where the conductive layers 24c are connected. Another option is to use the conductive resin sheet 24 that has a one-layer structure (monolayer structure) in which carbon black 24e is mixed with an EVA resin 24d as illustrated in FIG. 12B. In this case, the entire conductive resin sheet 24 is an electrode portion. The conductive resin sheet 24 of FIG. 12C can also be used which has a two-layer structure obtained by printing carbon black 24e on a PS resin 24d.

The embodiment uses a flexible monolayer conductive resin sheet 24 of FIG. 12B in which carbon black 24e is dispersed in a base made of EVA. The content of carbon black 24e dispersed in EVA when expressed in weight percent concentration is 35 (30 to 40) wt. %. As a countermeasure for spike current which will be described later, the content of dispersed carbon black 24e is set so that the resistance is 103 to 105Ω when measured by a measurement method described later. It is preferred to use the conductive resin sheet 24 whose total thickness "t" is 0.05 to 0.3 mm from the ease of the processing of adhering the conductive resin sheet 24, although depending on the shape of a surface of the developer container 46 to which the conductive resin sheet 24 is adhered. The total thickness "t" in the embodiment is 0.1 mm. While an example of using carbon black as a carbon material which gives conductivity is described here, the conductivity may be given by other carbon materials than carbon black, such as graphite, a carbon fiber, or a carbon nanotube.

Figure 14A:
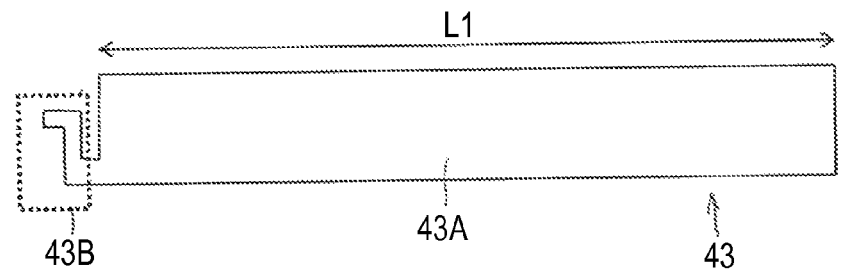
FIGS. 14A and 14B are respectively a plan view of an example of an antenna member and an explanatory diagram of a resistance measuring method.
Figure 15A:
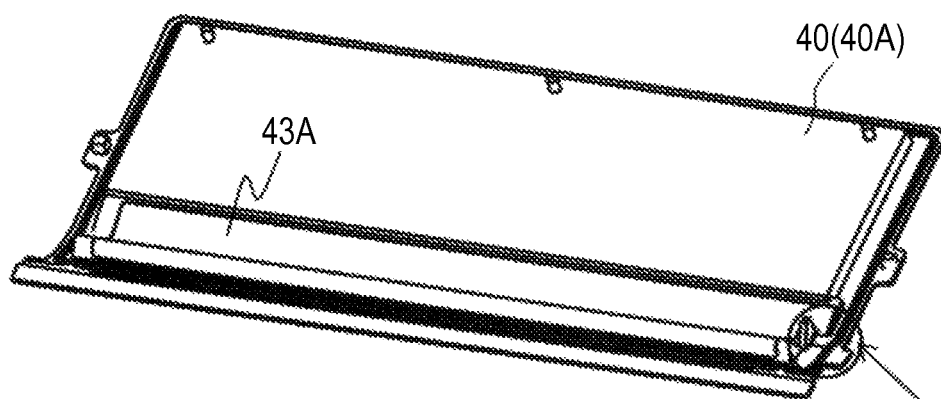
FIGS. 15A and 15B are perspective views illustrating the arrangement of the antenna member in a developing frame.
Figure 15B:
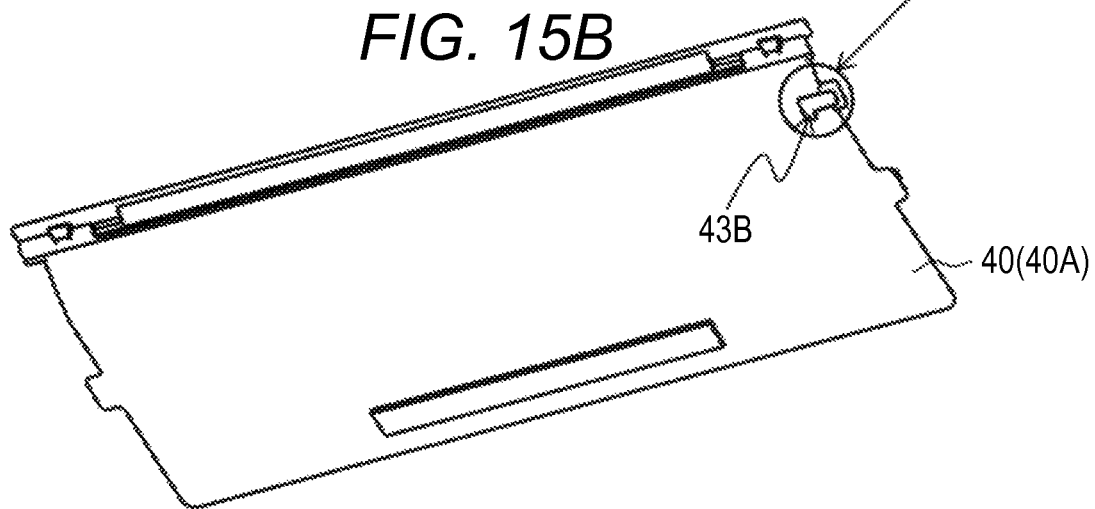

FIG. 14A is a plan view that illustrates the antenna member 43 of the embodiment in more detail. The antenna member 43 in the embodiment has a part which is rectangular in plan view and that has a predetermined length in the longitudinal direction, which is substantially parallel to the longitudinal direction (rotation axis direction) of the developing sleeve 41, and a predetermined length in the lateral direction, which intersects (substantially orthogonal in the embodiment) the longitudinal direction of the antenna member 43. In order to obtain electrical connection from an end portion, which is far from the developing sleeve 41, in the lateral direction of the rectangular part at an end portion of the rectangular part on the near side in the drawing sheet of FIG. 9 to a contact point (not shown) in the apparatus main body 110, the conductive resin sheet 24 is extended to the outside of the developer container 46. In short, a rectangular area of the antenna member 43 in the embodiment is a measurement portion 43A as illustrated in FIG. 14A. An extended area of the antenna member 43 which is enclosed by a dotted line in FIG. 14A is a contact point portion 43B, which serves as an electrical contact point between the antenna member 43 and the apparatus main body 110. The contact point portion 43B is connected to an earth via a contact point with the apparatus main body 110 (not shown) and the toner remaining amount detecting device 134 arranged in the apparatus main body 110. FIGS. 15A and 15B are perspective views illustrating the developing frame 40 (the lower frame 40A, in particular) of the embodiment. FIG. 15A illustrates the inside of the developer container 46, and FIG. 15B illustrates the outside of the developer container 46. As illustrated in FIGS. 15A and 15B, the measurement portion 43A of the antenna member 43 is arranged in the developing frame 40 so as to face the developing sleeve 41, whereas the contact point portion 43B is arranged outside the developing frame 40. The conductive resin member forms the contact point portion 43B on the outside by extending to the outside through the inside of the developing frame 40. In the embodiment, the two frames are welded by ultrasonic welding. A part of the conductive resin member is passed through the thickness of the developing frame 40 toward the outside at a point inside the welded portion so as to be arranged outside the developing frame 40. The part of the conductive resin member which is exposed outside the developing frame 40 extends from inside the welded portion, goes around the welded portion, and reaches outside the welded portion. In this manner, the contact point portion 43B can be formed without being affected by the welded portion.

In the embodiment, the width in the longitudinal direction of the rectangular measurement portion 43A of the antenna member 43 (L1 in FIG. 14A) is 216 mm, which is a length dimension of a guaranteed printing area (image area), and the width of the measurement portion 43A in the lateral direction which is a direction perpendicular to this longitudinal direction is 15 mm. The antenna member 43 in the embodiment has a thickness of 100 µm.

The embodiment uses insert molding, with which the antenna member 43 can be fixed by compatibility or adhesion to the inner wall of the developer container 46 more precisely in terms of position precision in the arrangement of the conductive resin sheet 24, than when double-sided adhesive tape is used to fix the antenna member 43. As a result, the precision of the distance between the developing sleeve 41 and the antenna member 43 which are electrodes improves, which leads to an improvement in the precision of developer amount detection. The fixing method according to the first embodiment is particularly preferred.

On the other hand, in the case where the conductive resin sheet 24 which is made of EVA is molded in the developer container 46 by insert molding, a difference in the amount of thermal shrinkage between the conductive resin sheet 24 and the developer container 46 may cause the following phenomena. The first phenomenon occurs when the developer container 46 is larger in shrinkage amount than the conductive resin sheet 24, and the conductive resin sheet 24 may be undulated after cooling. The precision of the distance to the developing sleeve 41 consequently drops, which lowers the precision of developer amount detection. The second phenomenon is the distortion of the developer container 46 which occurs when the conductive resin sheet 24 is larger in shrinkage amount than the developer container 46 and the rigidity of the developer container 46 is smaller than the shrinking force of the conductive resin sheet 24. The precision of the distance to the developing sleeve 41 consequently drops, which lowers the precision of developer amount detection. The spouting preventing sheet 32 is also undulated, thereby letting the toner leak.

The above-mentioned phenomena are prevented by, for example, making the conductive resin sheet 24 larger in shrinkage amount than the developer container 46 and making the rigidity of the developer container 46 larger than the shrinking force of the conductive resin sheet 24. In this way, the molding may be completed while keeping the conductive resin sheet 24 pulled in close contact with the developer container 46. It has been found as a result of study that the conditions given above are satisfied by forming the conductive resin sheet 24 which has a Young's modulus of 0.2 to 0.3 GPa and a thickness of 0.1 mm when the developer container 46 is formed from HIPS to have a Young's modulus of 2.5 to 3.5 GPa and a thickness of 1.5 mm. With these settings, the molding can be completed without an undulation of the conductive resin sheet 24 and without a distortion of the developer container 46, while maintaining the precision of the distance to the developing sleeve 41, and the precision of developer amount detection is accordingly improved. In view of the above, the thickness and Young's modulus of the conductive resin sheet 24 in the embodiment are set to 0.1 mm and 0.25 GPa.

The conductive resin sheet 24 can be formed from any resin which adheres to the developer container 46 and which does not allow a magnetic toner to cling thereto. In the case where the developer container 46 which is used is made from HIPS, the conductive resin sheet 24 may be formed from PS instead of EVA. The conductive resin sheet 24 can also have any configuration as long as the configuration includes a conductive layer in which carbon black is dispersed in a surface layer, which comes into contact with the toner to be measured, of the conductive layer, and the same effect is obtained also with a sheet which has a multilayer configuration such as the ones illustrated in FIG. 12A and FIG. 12C.

It is preferred to arrange the conductive resin sheet 24 so that the conductive resin sheet 24 in the lateral direction is in the vicinity of the developing sleeve 41. This is because the toner that has been regulated by the developing blade 42 and dropped down is detected as a remaining toner as well with high precision.

IV. Comparison Between Examples and Comparative Examples

Configuration of Example 3

Example 3 is configured according to the second embodiment. The resistance of the conductive resin sheet 24 in Example 3 which is measured by a measurement method (1) which will be described later is equal to or less than 105Ω (105 Ω, 104 Ω, 103 Ω, 0Ω).

Configuration of Comparative Example 3

Comparative Example 3 differs from Example 3 in the antenna member 43. The antenna member 43 used in Comparative Example 3 is SUS 304, which is obtained by machining a SUS metal by rolling to a thickness of 500 μm and cutting the SUS into a strip which measures 216 mm in the longitudinal direction and 15 mm in the lateral direction. The SUS 304 which is originally nonmagnetic is magnetized when stress applied thereto causes martensitic transformation of the austenitic phase. The antenna member 43 of Comparative Example 3 is also magnetized as a result of stress applied by rolling and cutting.

Example 4

Example 4 is configured according to the second embodiment but differs from Example 3 in the antenna member 43. The shape, material, and fixing method of the antenna member 43 in Example 4 are the same as in Example 3, except that an amount of carbon black dispersed in an EVA resin of the conductive resin sheet 24 is lessened in Example 4. The resistance of this conductive resin sheet 24 which is measured by the measurement method (1) described later is $10^6$Ω.

(Evaluation Method)

The remaining toner amount is obtained by a remaining toner amount calculating method described below.

Figure 10:
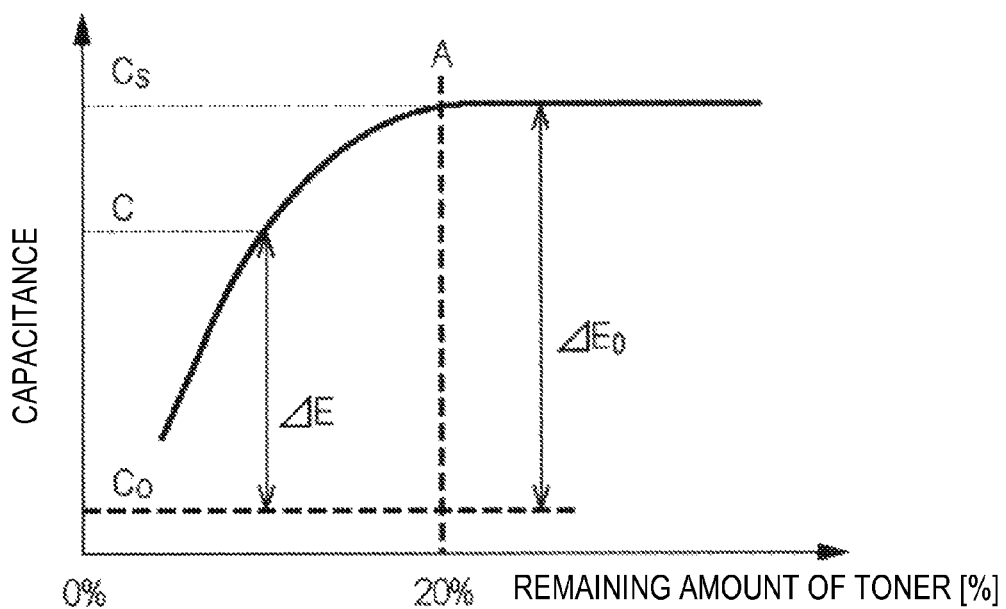
FIG. 10 is a graph showing a relation between the remaining toner amount and the capacitance in the second embodiment.

FIG. 10 is an example of a relation between the remaining toner amount and the capacitance according to the second embodiment. The axis of ordinate indicates capacitance detected by the toner remaining amount detecting device 134, and the axis of abscissa indicates the remaining toner amount (%). With the configuration of the second embodiment, the capacitance does not change during a time period between an initial point (100%) and a 20% (broken line A). This is because the remaining toner amount is large enough not to cause a change in toner amount (developer amount) between the developing sleeve 41 and the antenna member 43. When the remaining toner amount becomes equal to or less than 20%, the capacitance decreases linearly with the reduction in remaining toner amount. This indicates that the toner amount (developer amount) between the developing sleeve 41 and the antenna member 43 is changing with changes in remaining toner amount.

A difference between capacitance $C_0$ and capacitance $C_s$ is given as $\Delta E_0$. The capacitance $C_0$ represents the capacitance of when the cartridge is new and there is no toner between the developing sleeve 41 and the antenna member 43. The capacitance $C_s$ represents the capacitance in a period between the time when the remaining toner amount is 100% (full) and the time when the remaining toner amount is 20%. When an average value of capacitance measured while one sheet of image is printed is output as capacitance C, a difference between capacitance during image printing and the capacitance $C_0$ which is the capacitance of when there is no toner between the developing sleeve 41 and the antenna member 43 is given as ΔE. Then the current remaining toner amount is calculated by the following Expression (1).

Current remaining toner amount=20%×$\Delta E/\Delta E_0$    Expression (1)

The detection result is notified to the user by displaying the result on the display portion of the image forming apparatus 100, a monitor 21 of the personal computer 20, or the like.

Evaluation Result

Comparison in Remaining Toner Amount Detection Precision Between Example 3 and Comparative Example 3

Figure 11A:
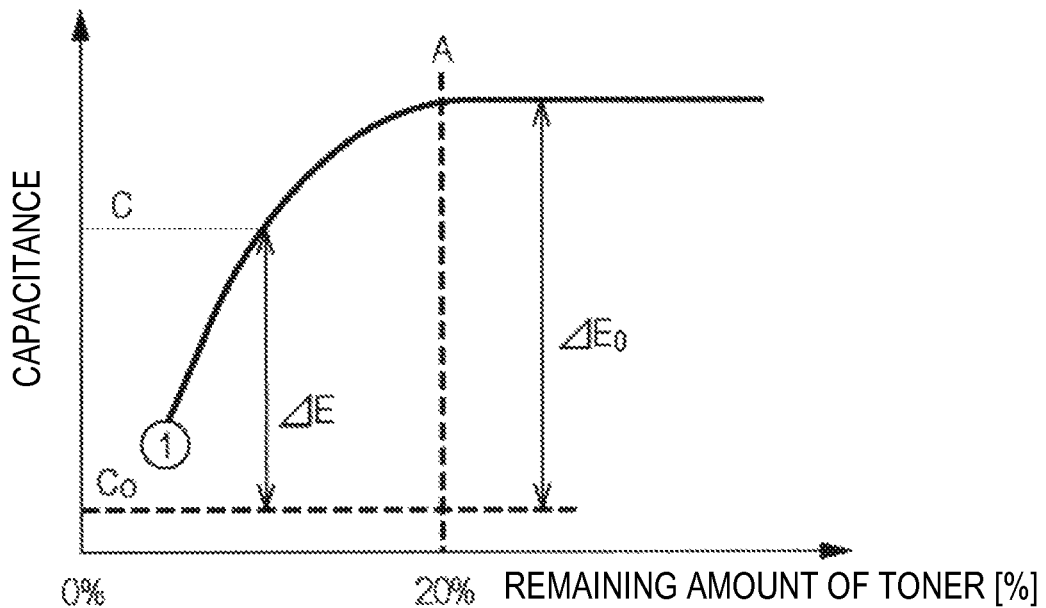
FIGS. 11A and 11B are graphs respectively showing relations between the remaining toner amount and the capacitance in Example 3 according to the second embodiment and Comparative Example 3.
Figure 11B:
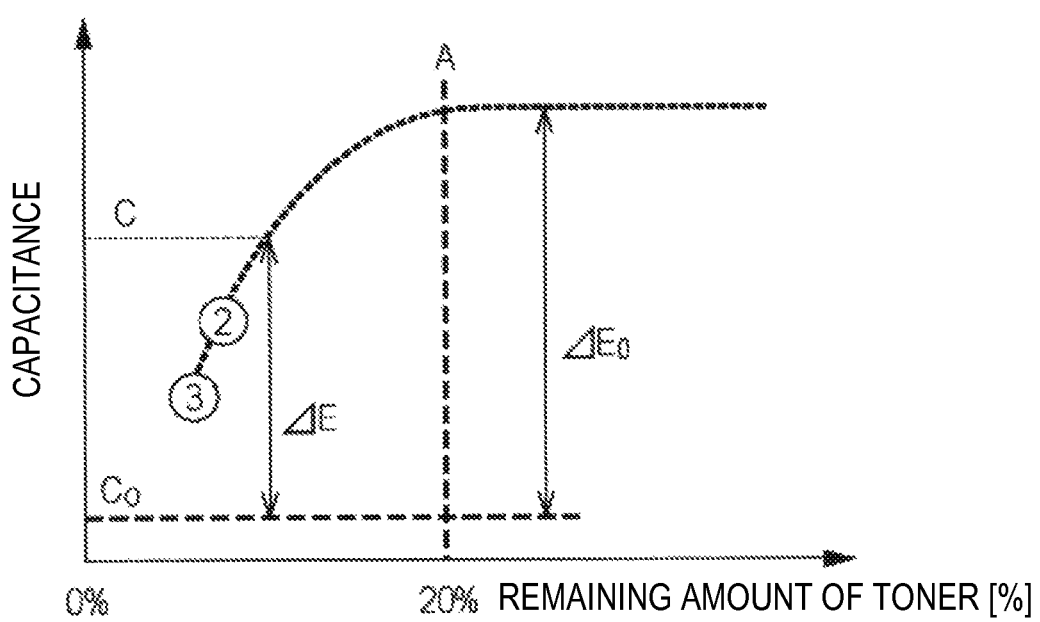

FIG. 11A shows a relation between the remaining toner amount and the capacitance that were actually measured or output in an endurance test conducted on Example 3. FIG. 11B shows a relation between the remaining toner amount and the capacitance which were actually measured or output in an endurance test conducted on Comparative Example 3. The axis of abscissa indicates the amount of toner which is actually remaining in the developer container 46, and the axis of ordinate indicates the capacitance.

In FIG. 11A which is a graph of Example 3, the capacitance does not change when the remaining toner amount is 100% to 20%. The capacitance decreases linearly with the reduction in remaining toner amount in an area where the remaining toner amount is equal to or less than 20%. At the time of "1" in FIG. 11A, an image in which a toner is not developed in a vertical belt pattern (hereinafter also referred to as "image with a blank area") was generated. No toner clinging to the antenna member 43 at that time and, consequently, shaking the developing apparatus 4 at the time of "1" did not remedy the blank area.

Similarly to Example 3, the capacitance in Comparative Example 3 does not change when the remaining toner amount is 100% to 20% as shown in FIG. 11B. The capacitance decreases linearly with the reduction in remaining toner amount in an area where the remaining toner amount is equal to or less than 20%. However, an image with a blank area was generated at the time ("2" in FIG. 11B) when the remaining toner amount was larger than in Example 3. It was confirmed that toner clinged to the antenna member 43 at that time. Although the amount of toner (developer) remaining between the electrodes is the same, the toner clinging to the antenna member 43 cannot be used for development. Consequently, a blank area occurred at the time of "2" where the detected toner amount (developer amount) was large.

The toner has clung to the antenna member 43 because the antenna member 43 is magnetized. After the toner clinging to the antenna member 43 was suctioned, the remaining toner amount was measured again to reveal that the remaining toner amount detected was "3", which was the same as in Example 3. An image generated at that time had a blank area similarly to the image generated at the time of "2". Thus, when an image with a blank area is generated in Comparative Example 3 varies depending on the amount of toner clinging to the antenna member 43. In addition, how much toner clings to the antenna member 43 varies from one developing apparatus to another, which lowers the precision of remaining toner amount detection.

The test shows that, in Example 3 where no toner clinged to the antenna member 43 at the time of "1", a full proportion of the toner between the electrodes is effectively put into use. In other words, a drop in the precision of remaining toner amount detection due to the clinging of toner to the antenna member 43 is prevented and the precision is improved in remaining toner amount detection.

Comparison in Remaining Toner Amount Detection Precision Between Example 3 and Example 4

Table 1 shows a relation between the resistance of the conductive resin sheet measured by a measurement method (1) which will be described later and the precision of remaining toner amount detection. A symbol "○" registered for "remaining amount detection" indicates that the remaining toner amount was detected with precision, and a symbol "Δ" registered for "remaining amount detection" indicates that, although the remaining toner amount was detected, performing signal processing or the like is preferred because the detection signal was small. A symbol "x" registered for "remaining amount detection" indicates that the remaining toner amount was not detected successfully.

Table 1 shows that the precision of remaining toner amount detection is favorable in Example 3, where the resistance of the conductive resin sheet is $10^5 \Omega$ or less. When the resistance of the conductive resin sheet is $10^6 \Omega$ or more as in Example 4, on the other hand, the detection signal is small and signal processing of some kind is necessary in order to grasp the capacitance accurately. This is because the high resistance of the conductive resin sheet reduces a current that flows into the toner remaining amount detecting device 134, which makes it difficult for the toner remaining amount detecting device 134 to detect capacitance. The resistance of the conductive resin sheet is therefore desirably $10^5 \Omega$ or less. The resistance value per unit length in this case was 420 $\Omega$/mm.

TABLE 1

Relation between conductive sheet resistance measured by measurement method (1) and remaining toner amount detection precision

|           | Resistance [$\Omega$] | Remaining amount detection |
|-----------|-----------|------|
| Example 4 | $10^6$    | Δ    |
| Example 3 | $10^5$    | ○    |
|           | $10^4$    | ○    |
|           | $10^3$    | ○    |
|           | 0         | ○    |

Configuration of Example 5

Example 5 is configured according to the second embodiment. The resistance of the conductive resin sheet 24 in Example 5 which is measured by a measurement method (2) which will be described later is equal to or more than $10^3 \Omega$.

FIG. 13 illustrates a toner remaining amount detecting circuit as the one disclosed in, for example, Japanese Patent Application Laid-Open No. 2007-264612. The toner remaining amount detecting circuit does not have a mechanism for reducing the amount of current flowing in the toner remaining amount detecting circuit (a protective resistor) when spike current such as fluctuations caused by the application of an AC voltage flows. A detector of the toner remaining amount detecting device 134 consequently has a fear of malfunction. Example 5 therefore focuses attention also on a solution for the malfunction of the detector which is caused by spike current.

The antenna member 43 in Example 4 was adjusted in the amount and distribution of carbon black so that the resistance measured by the measurement method (2) which will be described later was equal to or more than $10^3 \Omega$ ($10^3 \Omega$, $10^4 \Omega$).

Configuration of Comparative Example 4

The antenna member 43 of Comparative Example 4 was the SUS 304 which is commonly used. The resistance of the SUS 304 measured by the measurement method (2) which will be described later was 0$\Omega$.

Evaluation Result

Comparison in Spike Current Reduction Between Example 5 and Comparative Example 4

Table 2 shows a relation between the resistance measured by the measurement method (2) which will be described later and a spike current reducing effect. The relation of the symbols "○", "Δ", and "x" in Table 2 is the same as in Table 1.

Table 2 shows that the precision of remaining toner amount detection and the spike current reducing effect were both favorable when the resistance of the conductive resin sheet was $10^3 \Omega$ or more. The resistance value per unit length in this case was 30 $\Omega$/mm. In Comparative Example 4, where the resistance was 0$\Omega$, the spike current reducing effect was low and a drop in the precision of remaining toner amount detection by the toner remaining amount detecting device 134 was a possibility.

TABLE 2

Relation between conductive sheet resistance measured by measurement method (2) and spike current reducing effect

|                       | Resistance [$\Omega$] | Spike current reduction |
|-----------------------|-----------|----|
| Example 5             | $10^4$    | ○  |
| Comparative Example 4 | $10^3$    | ○  |
|                       | 0         | x  |

It is concluded from the results of Examples 3 to 5 that spike current can be reduced while maintaining the precision of remaining toner amount detection by setting the conductive resin sheet resistance which is measured by the measurement method (1) to $10^5 \Omega$ or less and setting the conductive resin sheet resistance which is measured by the measurement method (2) to $10^3 \Omega$ or more. In short, it is preferred to set the resistance of the conductive resin sheet to $10^3 \Omega$ or more and $10^5 \Omega$ or less.

V. Conductive Resin Sheet Resistance Measurement Method

Methods of measuring the resistance of a conductive resin sheet in the second embodiment will be described.

The conductive resin sheet resistance varies depending on the distance from a contact point. The conductive resin sheet resistance is therefore defined by the following two measurement methods.

<Measurement Method (1)>

Figure 14B:
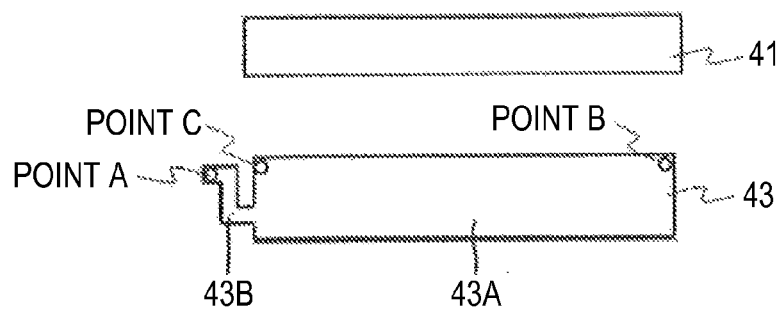

The resistance between a measurement point A and a measurement point B which are illustrated in FIG. 14B is measured. The measurement point A is a tip end portion in the contact point portion 43B (a surface on the same side as a surface of the measurement portion 43A that comes into contact with developer). The measurement point B is a point in the measurement portion 43A (the surface that comes into contact with developer) which is farthest from the measurement point A (the measurement point B is a point on the side of the developing sleeve 41 in the lateral direction). Conductive grease is applied to each of the measurement points in a circular pattern having a diameter of 5 mm, and the resistance between the measurement point A and the measurement point B is measured with the use of Fluke 87V manufactured by Fluke Inc.

<Measurement Method (2)>

The resistance between the measurement point A and a measurement point C which are illustrated in FIG. 14B is measured. Similarly to the above, the measurement point A is a tip end portion in the contact point portion 43B (the surface on the same side as the surface of the measurement portion 43A that comes into contact with developer). The measurement point C is a point in the measurement portion 43A (the surface that comes into contact with developer) which is closest from the measurement point A (the measurement point C is a point on the side of the developing sleeve 41 in the lateral direction). Conductive grease is applied to each of the measurement points in a circular pattern having a diameter of 5 mm, and the resistance between the measurement point A and the measurement point C is measured with the use of Fluke 87V manufactured by Fluke Inc.

While the clinging of a magnetic toner to the electrode is regarded as a problem in the second embodiment, the second embodiment has a configuration which is novel in itself, and allows the use of a conductive sheet as a remaining toner amount detecting member which uses capacitance even with a nonmagnetic toner which does not cause the problem of clinging.

Third Embodiment

A third embodiment of the present invention will be described next. In the third embodiment, components whose functions and configurations are the same as, or equivalent to, those in the first and second embodiments are denoted by the same reference symbols, and detailed descriptions thereof are omitted.

In the embodiment, a description will be provided of the arrangement of a resin-made antenna member which is preferred in order to improve detection precision of the developer amount by the capacitance detection method with the use of the antenna member.

I. Developing Apparatus

FIG. 16 is a schematic sectional view of the developing apparatus 4 in the embodiment.

The sealing member 48 in the third embodiment is adhered to, for example, a seal welding rib 47 which is provided on a part of the bottom of the developer containing portion 40a which is in the vicinity of the toner supply opening 46d. Therefore, in the case where the bottom of the developer containing portion 40a is flat, the seal welding rib 47 may hinder the circulation of the toner T from the toner chamber 46b to the developing chamber 46a. The third embodiment avoids this by providing a convex portion 46e between the developing sleeve 41 and the agitating member 45, which is as tall as, or taller than, the seal welding rib 47 when the developing apparatus 4 is in use. The convex portion 46e in the third embodiment is provided on a part of the bottom of the toner chamber 46b which is adjacent to the toner supply opening 46d. The convex portion 46e projects toward the interior of the developer container 46 and also projects toward the developing sleeve 41. The convex portion 46e enables the agitating member 45 to move the toner T toward the vicinity of the developing sleeve 41 without a hitch, despite the presence of the seal welding rib 47. A part of the bottom of the toner chamber 46b which is opposite to the developing sleeve 41 with respect to the convex portion 46e has a concave portion 46f. The agitating sheet 45b enters the concave portion 46f to an appropriate degree when the agitating member 45 is driven and rotated. The toner T moved by the agitating sheet 45b toward the convex portion 46e is flung by the agitating sheet 45b which has just been released around the peak of the convex portion 46e, and is thus moved to the vicinity of a part of the surface of the developing sleeve 41 that corresponds to the magnetic pole S2 of the magnet roller 44. In this manner, the toner T deposited on the bottom of the toner chamber 46b can be conveyed to the vicinity of the developing sleeve 41 more securely. The sealing member 48 in the third embodiment is attached to an agitating shaft of the agitating member 45.

II. Detecting Device

The detecting device 130 of the embodiment will be described next. The basic configuration and operation of the detecting device 130 in the embodiment are substantially the same as in the first and second embodiments.

Figure 17:
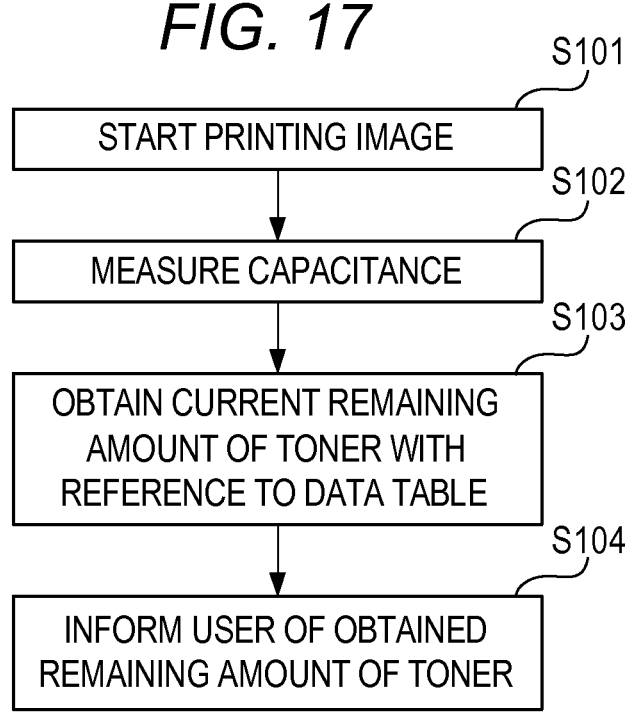
FIG. 17 is a flowchart of processing in which the remaining toner amount is detected and indicated.

FIG. 17 illustrates the schematic flow of processing of detecting the amount (remaining amount) of the toner T and informing the user or others of the detected amount. First, the controller portion 133 starts an image printing operation (S101). The controller portion 133 next obtains a capacitance measurement result which is measured by the capacitance detecting circuit 132 during image printing (S102). The controller portion 133 then refers to the capacitance detection result and the data table to obtain the current remaining amount of the toner T (S103). The controller portion 133 next informs a user of information related to the obtained remaining amount of the toner T (S104) by displaying the information on the display portion (not shown) which is provided in the apparatus main body 110, or the monitor 21 of the personal computer 20.

As the data table for obtaining the current remaining amount of the toner T from the capacitance detected by the capacitance detecting circuit 132, capacitance transitions accompanying the consumption of the toner T are obtained in advance, such as transitions indicated by the solid line in FIG. 19, which will be described later. This information in the third embodiment is stored in a process cartridge-side memory 13 (FIG. 2) which is provided in the process cartridge 120. The relation between the amount of the toner T and the capacitance can be obtained by, for example, as follows. Each time a predetermined amount of the toner T is poured sequentially into the developer container 46 which is empty in the beginning, the process cartridge 120 which includes the developer container 46 is loaded in the image forming apparatus 100 to perform a pre-multi-rotation operation, and the capacitance detecting circuit 132 then measures the capacitance. The pre-multi-rotation operation is a preparatory operation which is performed after the image forming apparatus 100 is powered on and before the image forming apparatus 100 is ready for image formation.

III. Configuration and Manufacturing Method of Antenna Member

It was found as a result of study conducted by the inventors of the present invention that the precision of developer amount detection dropped in some cases even though a conductive resin sheet which served as a resin electrode was molded integrally with a developing frame by insert molding. For instance, there was a case where the depletion of developer was indicated despite the fact that a relatively large amount of developer was still left. The reason thereof is as follows. Specifically, the conductive resin sheet which has been set in a mold with high position precision for the molding of the developing frame is heated by the heat of an injected resin and shrinks thermally in a cooling (curing) step. As a result, the position precision varies in an end portion of the conductive resin sheet, which changes the distance between the end portion of the conductive resin sheet and the developing sleeve serving as the other electrode. Capacitance detection thus yields different results for the same developer amount, and the precision of developer amount detection drops accordingly.

The third embodiment addresses this by setting the arrangement of the antenna member 43 so that the precision in the detection of the amount of the toner T is prevented from dropping even when the distance between the antenna member 43 and the developing sleeve 41 varies as described above. Details of the arrangement will be described later.

Figure 18:
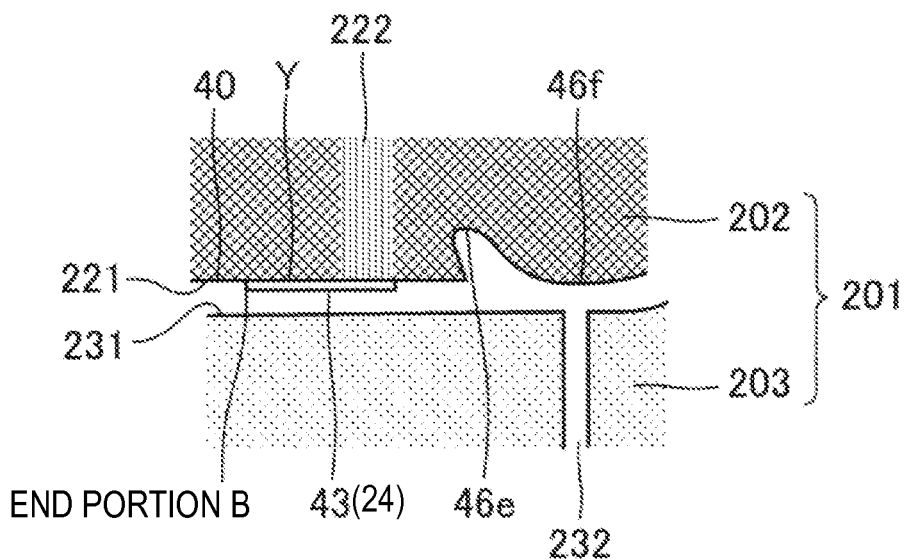
FIG. 18 is a schematic sectional view of a mold illustrating steps of manufacturing a developer container according to the third embodiment.

FIG. 18 is a sectional view of a part of the mold 201 configured to mold the developing frame 40 which is in the vicinity of where the conductive resin sheet 24 constituting the antenna member 43 is arranged. In the third embodiment, the air suction portion 222 is provided in an end portion of the conductive resin sheet 24 on the side of the gate 232, and the conductive resin sheet 24 is suctioned to the first mold 202 in this end portion. This facilitates the prevention of wrinkles due to the stretching of the conductive resin sheet 24 by heat from a resin injected into the mold 201, and the prevention of misalignment due to thermal shrinkage of the conductive resin sheet 24 during cooling. For the positioning by air suction, it is only necessary to ensure that the conductive resin sheet 24 cannot be moved by the pressure of the injected resin, and substantially the entire surface of the conductive resin sheet 24 may be suctioned by air suction.

The conductive resin sheet 24 in the third embodiment is a monolayer structure conductive resin sheet which is given conductivity by dispersing carbon black as a conductive material in a base made of EVA. The conductive resin sheet 24 that has a multilayer structure generally has a thin conductive layer. It is therefore advisable to be careful with friction that occurs when, for example, a metal contact point is brought into contact with the conductive resin sheet 24 in order to obtain electrical connection to a grounding pole.

The measurement portion of the conductive resin sheet 24 in the third embodiment is substantially rectangular. The length in the longitudinal direction of the measurement portion is 216 mm, which is the same as the dimension of the image area (guaranteed printing area) in a direction substantially orthogonal to the image conveying direction. The length in the lateral direction of the measurement portion is 40 mm. The conductive resin sheet 24 has a thickness of 100 μm. The developing frame 40 (in particular, the bottom of a part of the developer containing portion 40a which is in the vicinity of the antenna member 43) has a thickness of 1.5 mm.

IV. Arrangement of Antenna Member

The arrangement of the antenna member 43 will be described next. There is a possibility that the position of the antenna member 43 may be shifted even when the manufacturing methods described above are used. The chance of misalignment is particularly high for an end portion of the antenna member 43 in the lateral direction which is a direction intersecting (in the third embodiment, substantially orthogonal to) the longitudinal direction (axial direction) of the developing sleeve 41, which serves as the other electrode. This is because of tolerance for the installation position of the conductive resin sheet 24 set in the mold 201 (the first mold 202), tolerance for the shape distortion (thermal shrinking and the like) of the conductive resin sheet 24 that occurs in the process from the injection of a resin into the mold 201 to the cooling, and others. The precision in the detection of the amount of the toner T tends to drop when the position of an end portion B is shifted. The end portion B is an end portion of the antenna member 43 which is closer to the developing sleeve 41 when viewed in the longitudinal direction (axial direction) of the developing sleeve 41, and which is on the side of the developing sleeve 41 in the lateral direction (FIG. 18).

In the third embodiment, the distance between the developing sleeve 41 and the end portion B, which is not positioned by air suction, tends to change significantly in the lateral direction of the antenna member 43, compared to the other end portion of the antenna member 43 (an end portion which is on the side of the gate 232 when molded) (FIG. 18).

Figure 21A:
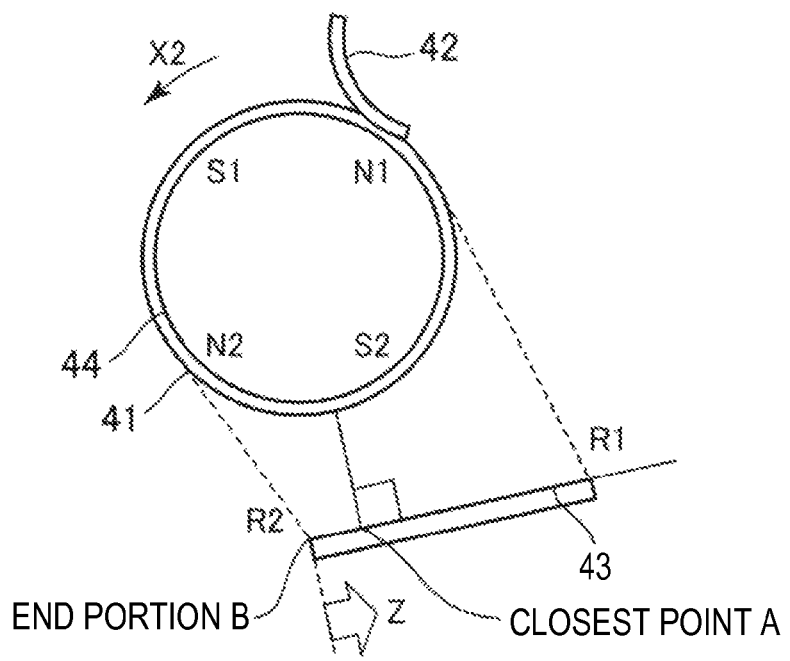
FIG. 21A is a schematic sectional view of a substantial part of the developing apparatus according to the third embodiment.

The third embodiment addresses this by setting the arrangement of a closest point A as illustrated in FIG. 21A. The closest point A is a point on the antenna member 43 where the antenna member 43 is closest to the developing sleeve 41 as viewed along the longitudinal direction (axial direction) of the developing sleeve 41. Specifically, the closest point A is arranged in other places than an end portion of the antenna member 43 (to be exact, the end portion B which is closer to the developing sleeve 41).

In this way, the precision in the detection of the amount of the toner T is prevented from dropping even when the distance between the antenna member 43 and the developing sleeve 41 varies because of the shrinking of the conductive resin sheet 24 or the like.

V. Effects (Relation Between Way of Toner Deposition and Detected Capacitance)

Figure 19:
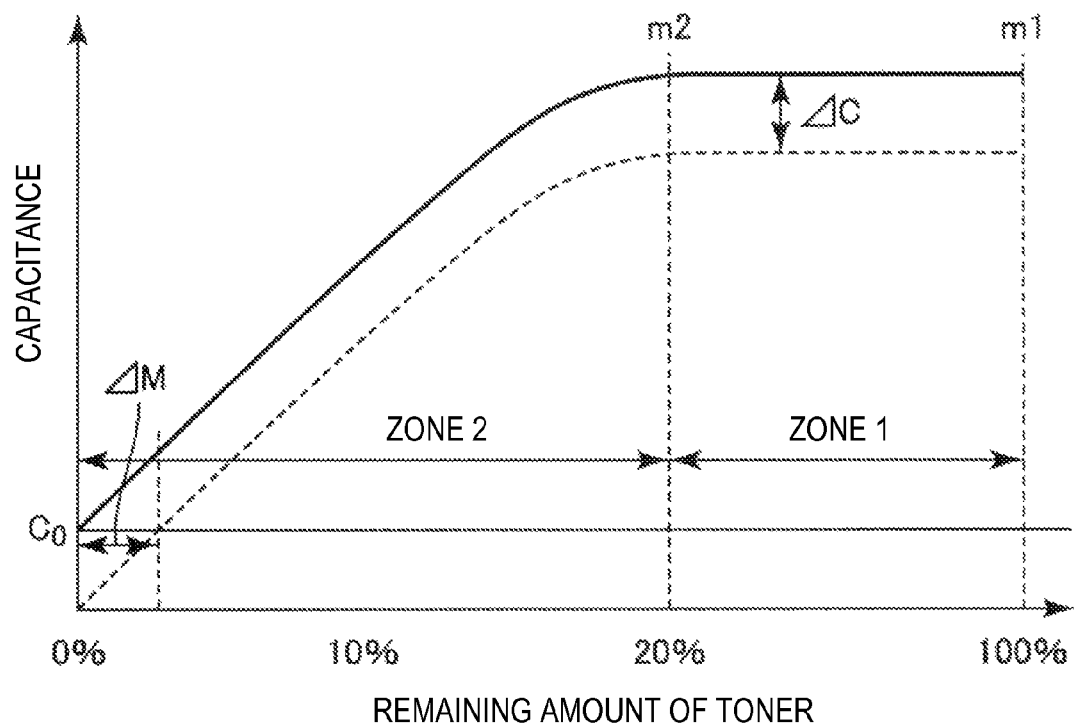
FIG. 19 is a graph showing an example of a relation between the remaining toner amount and the capacitance in the third embodiment.

FIG. 19 shows a relation between the remaining toner amount and the capacitance. The axis of abscissa indicates the remaining toner amount and the axis of ordinate indicates the detected capacitance. The capacitance which is detected when the remaining toner amount is 0% is represented by $C_0$. In the third embodiment, the user is informed of toner depletion (out of toner) when the capacitance reaches $C_0$ on account that an image with a blank area may be generated at that point.

The solid line in FIG. 19 represents the relation between the remaining toner amount and the capacitance which is obtained in advance in the configuration of the third embodiment in the manner described above. The broken line in FIG. 19 represents a relation between the amount of toner actually remaining in the developer container 46 and the detected capacitance when the distance between the antenna member 43 and the developing sleeve 41 becomes larger because of, for example, a positional gap of the antenna member 43. A differential between the solid line and the broken line is given as $\Delta C$. When the broken line is below the solid line, the distance between the antenna member 43 and the developing sleeve 41 is widened and the capacitance which is detected for the same remaining toner amount is accordingly lower. When the capacitance $C_0$ is detected, the remaining toner amount indicated by the solid line is 0%. The remaining toner amount indicated by the broken line, on the other hand, is not 0% and is larger by $\Delta M$. Thus, a change in the distance between the antenna member 43 and the developing sleeve 41 causes a change in capacitance by $\Delta C$ with respect to the remaining toner amount. The change in capacitance results in a difference of $\Delta M$ in the remaining toner amount when the capacitance $C_0$ is detected.

In FIG. 19, the capacitance is constant irrespective of the remaining toner amount in a zone 1 where the remaining toner amount is m1 to m2. FIG. 20A is a schematic sectional view of a part of the developer container 46 which is in the vicinity of the antenna member 43, and schematically illustrates the way the toner deposits in the developer container 46 in this zone. FIG. 20A is viewed in the longitudinal direction (rotation axis direction) of the developing sleeve 41 (the same applies to FIGS. 20B, 21A, 22A, 23A, 24A, and 25A). Broken lines R1 and R2 in FIG. 20A each represents a tangent line of the developing sleeve 41 that passes through an end portion in the lateral direction of the antenna member 43. An area enclosed by the broken line R1, the broken line R2, the surface of the developing sleeve 41, and the surface of the antenna member 43 is a remaining toner amount measurement area (the same applies to FIGS. 20B, 21A, 22A, and 23A). In FIG. 20A, toner surface levels are respectively represented by H1 and H2. The toner surface level is at H1 when the process cartridge 120 is new, and gradually shifts to H2 as the toner is consumed by forming images. Until the toner surface level reaches H2, the remaining toner amount measurement area is filled with the toner and the capacitance is therefore constant irrespective of the remaining toner amount. The toner in the zone 1 circulates from an arrow T1 to an arrow T2 and then to an arrow T3 (T1→T2→T3). Specifically, the toner moved by the agitating member 45 to the vicinity of the developing sleeve 41 is supplied to the surface of the developing sleeve 41 by the magnetic pole S2 of the magnet roller 44 (the arrow T1). The toner supplied to the surface of the developing sleeve 41 is conveyed by the rotation of the developing sleeve 41 to a portion where the developing blade 42 and the developing sleeve 41 abut against each other (the arrow T2). The toner which is regulated by the developing blade 42 and scraped off the surface of the developing sleeve 41 is returned to the toner chamber 46b by the agitating member 45 (the arrow T3).

Next, the capacitance decreases with the reduction of the remaining toner amount in a zone 2 of FIG. 19 where the remaining toner amount is m2 to 0%. FIG. 20B is a schematic sectional view of a part of the developer container 46 which is in the vicinity of the antenna member 43, and schematically illustrates the way the toner deposits in the developer container 46 in this zone. In FIG. 20B, toner surface levels are respectively represented by H3 and H4. The toner surface level is at H3 and H4 around the time when the remaining toner amount is less than m2 in FIG. 19. The toner surface level is at H4 right before an image with a blank area is generated. The toner surface level H3 is in the toner remaining amount measurement area, and the capacitance therefore decreases from then on with the consumption of the toner. The toner ultimately deposits in the vicinity of the area where the developing sleeve 41 and the developing blade 42 abut against each other as indicated by the toner surface level H4, because of the action of the magnetic poles of the magnet roller 44. The toner in the zone 2 circulates as in the zone 1 and, additionally, some toner drops down to the vicinity of the antenna member 43 as indicated by an arrow t4. When the toner surface level reaches H4 ultimately, the toner circulates only within the toner deposit in the vicinity of the area where the developing sleeve 41 and the developing blade 42 abut against each other, from an arrow t1 to an arrow t2 and then to an arrow t3 (t1→t2→t3), with the rotation of the developing sleeve 41.

(Positional Relation Between Antenna Member and Developing Sleeve)

Variations in the position of the antenna member 43 lead to variations in capacitance detection result. The capacitance detection sensitivity is higher when the distance between the developing sleeve 41 and the antenna member 43 is closer. Therefore, a particularly high precision is demanded for the precision of the position of a part of the antenna member 43 which is closer to the developing sleeve 41.

FIG. 21A is a schematic sectional view of the vicinity of the antenna member 43 illustrating the arrangement of the developing sleeve 41 and the antenna member 43 in relation to each other in the third embodiment. The closest point A in the third embodiment is located in other places on the antenna member 43 than the end portion B. More specifically, the closest point A is located on the antenna member 43 between the end portion B and an end portion opposite thereto. The closest distance between the closest point A and the developing sleeve 41 is 5 mm, and the distance between the closest point A and the end portion B is 3 mm in the third embodiment. The closest distance between the end portion B and the developing sleeve 41 is 5.2 mm.

The specific arrangement of the antenna member 43 is not limited to the one in the third embodiment. It is only necessary to arrange the antenna member 43 in such a manner that the closest point A on the antenna member 43 (the second electrode) where the antenna member 43 is closest to the developing sleeve 41 is located in other places than the end portion B, which is on the side of the developing sleeve 41 (the first electrode) (specifically, other places than the end portion). It is preferred for the distance between the closest point A and the end portion B to be longer because then variations in the position of the end portion B affect the precision of remaining toner amount detection less.

Configuration of Comparative Example 5

Figure 22A:
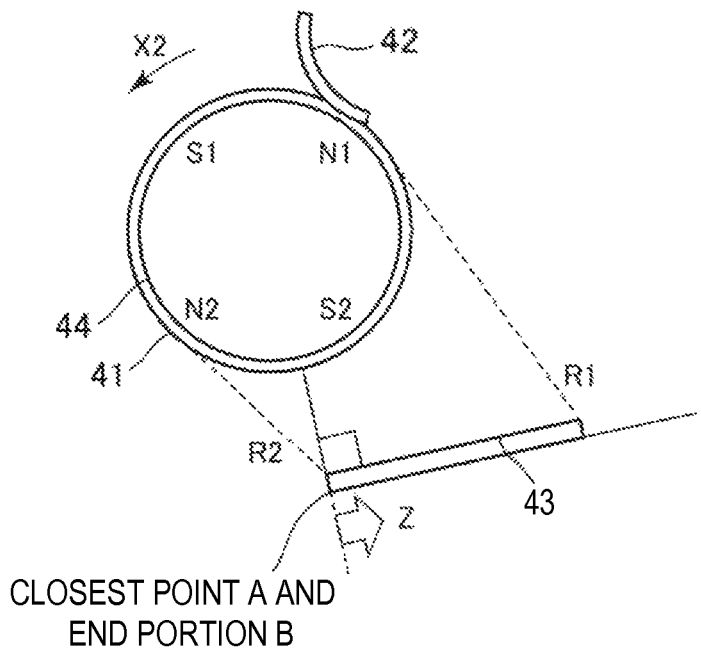
FIG. 22A is a schematic sectional view of a substantial part of a developing apparatus according to Comparative Example 5.

FIG. 22A is a schematic sectional view of the vicinity of the antenna member 43 illustrating the arrangement of the developing sleeve 41 and the antenna member 43 in relation to each other in Comparative Example 5. The configuration of Comparative Example 5 is substantially the same as that of the third embodiment, except for points specifically noted below.

In Comparative Example 5, the antenna member 43 which is a plate-shaped member formed from stainless steel (SUS) (SUS sheet metal) is fixed to the developing frame 40 by sticking the antenna member 43 to the developing frame 40 with double-sided adhesive tape. In the antenna member 43 of Comparative Example 5, the closest point A to the developing sleeve 41 coincides with the end portion B, which is on the side of the developing sleeve 41.

Evaluation of Third Embodiment and Comparative Example 5

In the third embodiment illustrated in FIG. 21A and Comparative Example 5 illustrated in FIG. 22A, a part of the antenna member 43 where the end portion B is located in FIG. 22A was reduced in size in a direction indicated by an arrow Z (toward the other end portion of the antenna member 43) compared to that in FIG. 21A, thereby changing the position of the end portion B by 2 mm. The influence of position precision on the precision of remaining toner amount detection was then evaluated.

Figure 21B:
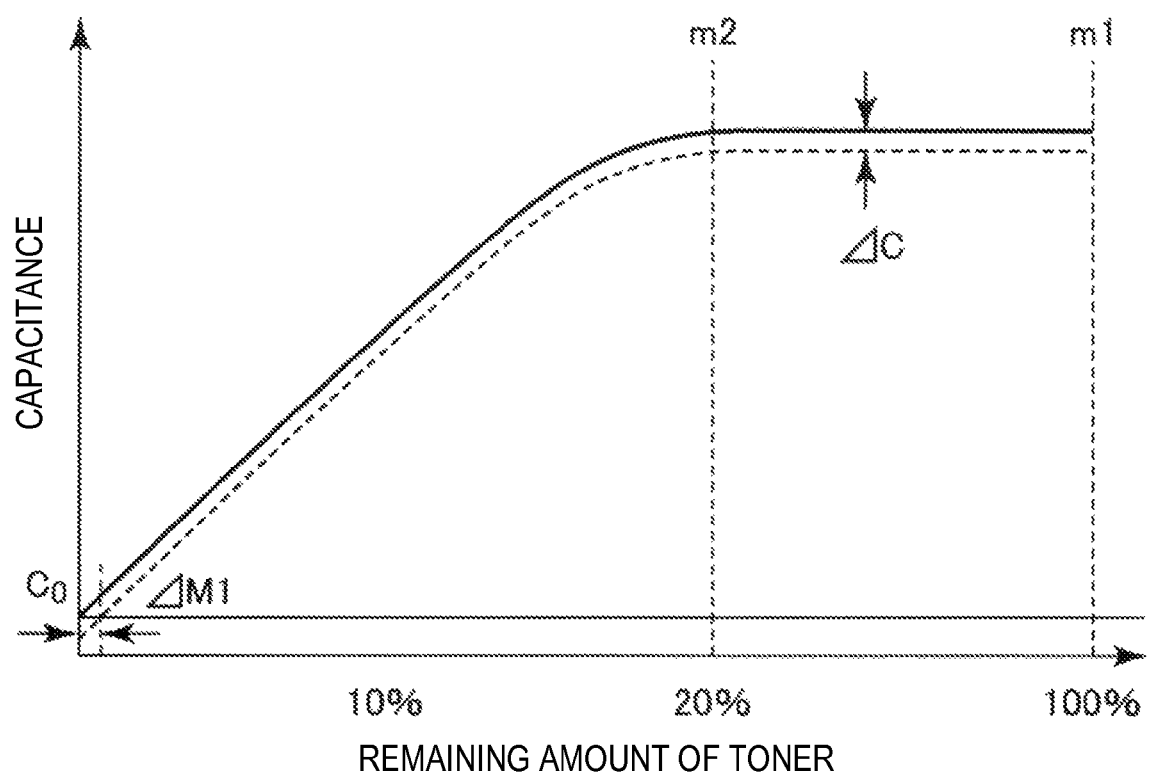
FIG. 21B is a graph illustrating a relation between transitions of the capacitance detection result and the position of an antenna member.
Figure 22B:
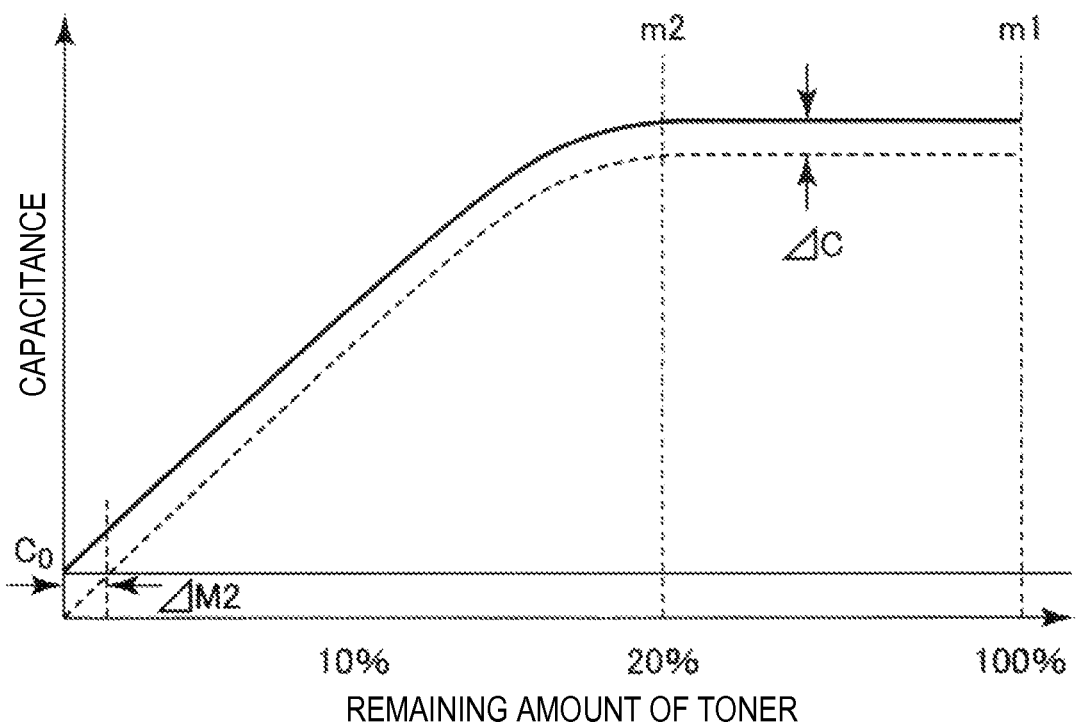
FIG. 22B is a graph illustrating a relation between transitions of the capacitance detection result and the position of the antenna member.

FIG. 21B shows a relation between the amount of toner actually remaining in the developer container 46 and the detected capacitance in the configuration of the third embodiment. FIG. 22B shows a relation between the amount of toner actually remaining in the developer container 46 and the detected capacitance in the configuration of Comparative Example 5. The solid line in FIG. 21B represents a remaining toner amount-capacitance relation in the third embodiment where the antenna member 43 is arranged as illustrated in FIG. 21A. The solid line in FIG. 22B represents a remaining toner amount-capacitance relation in Comparative Example 5 where the antenna member 43 is arranged as illustrated in FIG. 22A. In each of FIG. 213 and FIG. 22B, the broken line indicates a relation present between the remaining toner amount and the capacitance when the position of the antenna member 43 is shifted by 2 mm in the manner described above.

The solid lines in FIG. 21B and FIG. 22B indicate that the detected capacitance does not change in the zone 1 where the remaining toner amount is m1 to m2. This is because, in the zone 1, the toner surface level is between H1 and H2 as described with reference to FIG. 20A. The toner amount in the measurement area does not change with the reduction in remaining toner amount in this zone as described above, and the detected capacitance is therefore constant. The amount m2 in the third embodiment corresponds approximately to a remaining toner amount of 20%.

The solid lines in FIG. 21B and FIG. 22B indicate that the detected capacitance shifts linearly with respect to the remaining toner amount in the zone 2 where the remaining toner amount is m2 to 0%. This is because the toner amount in the measurement area decreases when the toner surface level shifts from H3 to H4 as described with reference to FIG. 20B.

The broken lines in FIG. 21B and FIG. 22B indicate the same trend in capacitance transitions as the one indicated by the solid lines. However, the value of the detected capacitance is overall smaller in the broken lines than in the solid lines. This is because, as can be understood from FIG. 21A and FIG. 22A, shifting the position of the end portion B of the antenna member 43 pushes the antenna member 43 farther from the developing sleeve 41, thereby lowering the value of the capacitance which is detected for the same remaining toner amount. When the detected capacitance is low, the remaining toner amount which is obtained by referring to the data table is small.

The differential (the amount of change) ΔC between the solid line and the broken line in the third embodiment illustrated in FIG. 21B is compared to the differential ΔC between the solid line and the broken line in Comparative Example 5 illustrated in FIG. 22B to reveal that the differential ΔC in Comparative Example 5 is larger. The differential ΔC is larger in Comparative Example 5 than in the third embodiment for the following two reasons:

Reason 1: Because the closest point A where the capacitance detection sensitivity is the highest in the antenna member 43 coincides with the end portion B, shifting the position of the end portion B by 2 mm changes the closest distance, which affects the capacitance detection sensitivity most. As a result, the detected capacitance value changes (drops) significantly, thereby increasing ΔC.

Reason 2: With the antenna member 43 made smaller by 2 mm in the direction of the arrow Z of FIG. 22A, the capacitance measurement range is narrowed and the detected capacitance value is reduced.

On the other hand, the third embodiment differs from Comparative Example 5 in the situations of Reason 1. The closest point A where the capacitance detection sensitivity is the highest does not coincide with the end portion B in the antenna member 43 of the third embodiment. Shifting the position of the end portion B by 2 mm therefore does not change the closest distance, which affects the capacitance detection sensitivity most, and the influence on the detected capacitance value is relatively small. As a result, the differential ΔC in the third embodiment is that much smaller than in Comparative Example for Reason 1. Because ΔC is smaller in the third embodiment, the differential ΔM in the amount of toner that remains upon detection of the capacitance $C_0$, which is when an image with a blank area is generated, is smaller in the third embodiment at ΔM1 than in Comparative Example 5, where the differential ΔM is ΔM2.

In the third embodiment, the closest point A and the end portion B are put in different places in the antenna member 43 as described above. This prevents the precision of remaining toner amount detection from dropping and thus ensures that the accurate remaining toner amount is indicated until the toner is used up even when the end portion B of the antenna member 43 is accidentally shifted by a positional gap in installation, a tolerance of respective parts, a distortion due to thermal shrinkage, and the like. The lowering of precision in developer amount detection is therefore prevented in cases where a conductive resin sheet is used as an electrode configured to detect capacitance. Accordingly, a developer container, a developing apparatus, a process cartridge, and an image forming apparatus that have a more inexpensive configuration can be provided while maintaining or improving the precision of developer amount detection.

Fourth Embodiment

A fourth embodiment of the present invention will be described next. In the fourth embodiment, components whose functions and configurations are the same as, or equivalent to, those in the first to third embodiments are denoted by the same reference symbols, and detailed descriptions thereof are omitted. The fourth embodiment is, in particular, a modification example of the third embodiment.

Figure 23A:
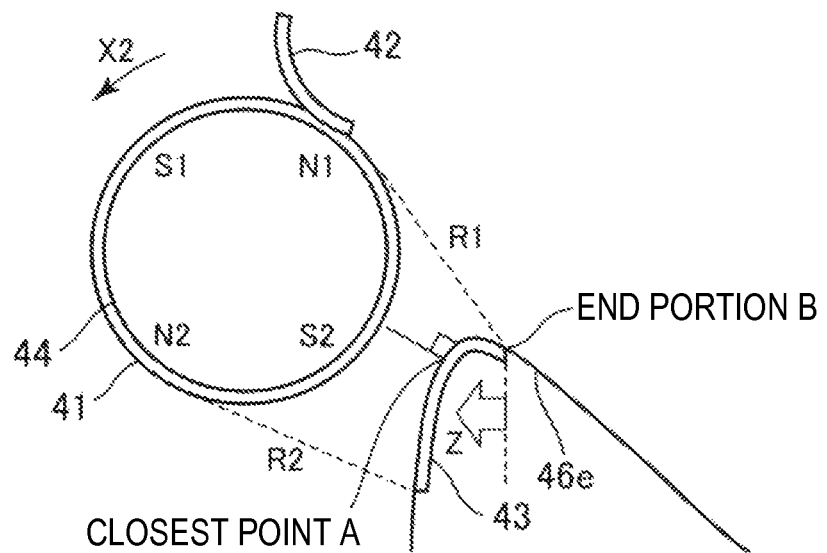
FIG. 23A is a schematic sectional view of a substantial part of a developing apparatus according to a fourth embodiment.

FIG. 23A is a schematic sectional view of a part of the developing apparatus 4 according to the fourth embodiment which is in the vicinity of the antenna member 43. The antenna member 43 in the fourth embodiment is arranged in the convex portion 46e, which is formed on the bottom of the developer containing portion 40a. The closest point A is arranged in a part of the antenna member 43 which is in the vicinity of the peak of the convex portion 46e. Compared to the third embodiment where the antenna member 43 is flat, this sets a wider distance between the end portion B of the antenna member 43 (an end portion on the side of the developing sleeve 41) and the developing sleeve 41 when the closest distance to the developing sleeve 41 is the same. The influence of variations in the position of the end portion B of the antenna member 43 is therefore even smaller than in the third embodiment.

In the fourth embodiment, the closest distance between the closest point A and the developing sleeve 41 is 5 mm, and the distance between the closest point A and the end portion B is 3 mm. The closest distance between the end portion B and the developing sleeve 41 is 6.8 mm, which is longer than in the third embodiment.

Figure 23B:
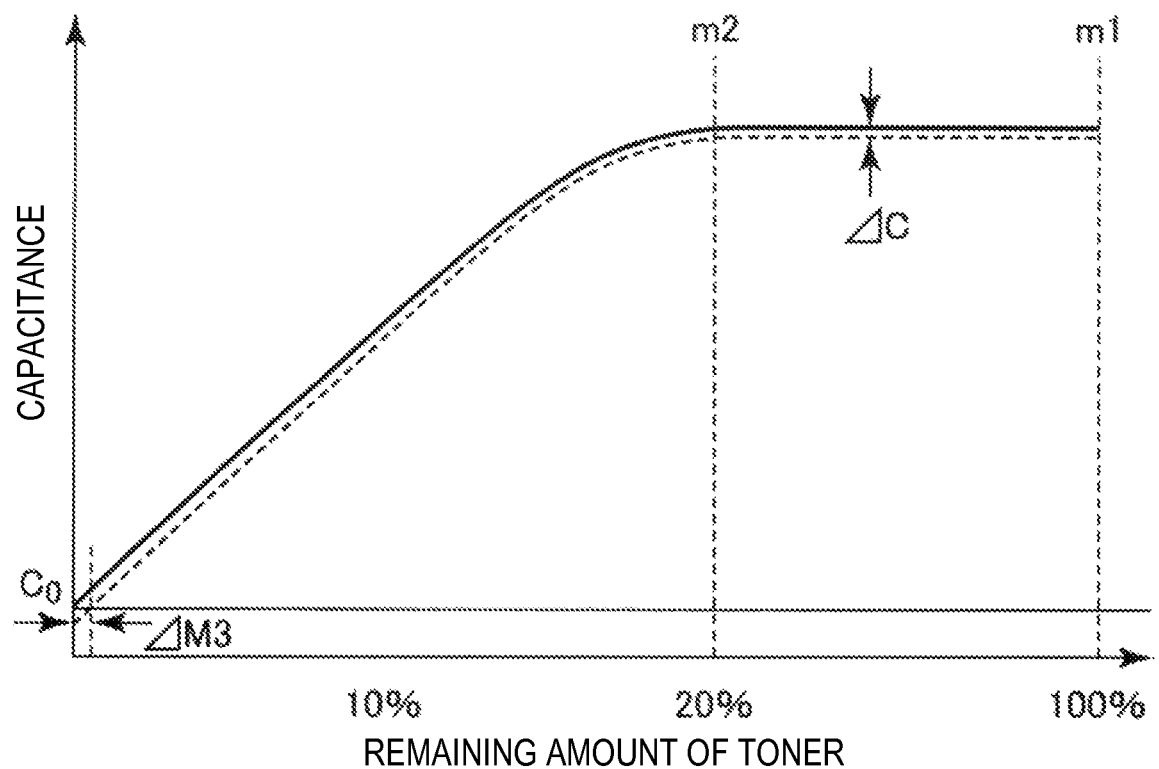
FIG. 23B is a graph illustrating a relation between transitions of the capacitance detection result and the position of an antenna member in the fourth embodiment.

The fourth embodiment has been evaluated in the same manner which is used in the third embodiment. FIG. 23B shows a relation between the amount of toner actually remaining in the developer container 46 and the detected capacitance in the configuration of the fourth embodiment. The solid line in FIG. 23B represents a remaining toner amount-capacitance relation in the arrangement of the antenna member 43 according to the fourth embodiment which is illustrated in FIG. 23A. The broken line in FIG. 23B represents a relation between the remaining toner amount and the capacitance when the position of the end portion B is shifted by 2 mm by reducing in size a part of the antenna member 43 of the fourth embodiment where the end portion B is located in a direction indicated by an arrow Z of FIG. 23A (toward the other end portion of the antenna member 43).

It is understood from FIG. 23B that shifting the position of the end portion B of the antenna member 43 has made the capacitance detected in relation to the actual remaining toner amount smaller. The differential (amount of change) ΔC between the solid line and the broken line in the fourth embodiment illustrated in FIG. 23B has been compared with the differential ΔC between the solid line and the broken line in Comparative Example 5 illustrated in FIG. 22B to reveal that the differential ΔC in Comparative Example 5 is larger. The differential ΔC is larger in Comparative Example 5 than in the fourth embodiment for Reason 1 and Reason 2 given above and for one more reason given below.

Reason 3: When the closest distance is the same, arranging the closest point A in the convex portion 46e sets a wider distance between the end portion B and the developing sleeve 41 than when the antenna member 43 is flat as in Comparative Example 5. This reduces the influence of a positional gap of the end portion B on the detected capacitance value even more.

The differential ΔC in the fourth embodiment is thus smaller than in Comparative Example 5. As a result, the differential ΔM in the amount of toner that remains upon detection of the capacitance $C_0$, which is when an image with a blank area is generated, is smaller in the fourth embodiment at ΔM3 than in Comparative Example 5, where the differential ΔM is ΔM2.

The differential ΔC in the fourth embodiment is smaller than ΔC in the third embodiment, and the differential ΔM3 in the fourth embodiment is smaller than ΔM1 in the third embodiment. This, too, is presumably because of Reason 3.

According to the fourth embodiment, the same effects as those of the third embodiment are obtained, and arranging the closest point A in the convex portion 46e provides an additional effect in that the lowering of the precision in remaining toner amount detection is prevented even better.

Fifth Embodiment

Another embodiment of the present invention will be described next. In the fifth embodiment, components whose functions and configurations are the same as, or equivalent to, those in the first to fourth embodiments are denoted by the same reference symbols, and detailed descriptions thereof are omitted. The fifth embodiment is, in particular, another modification example of the third embodiment.

In the third embodiment and the fourth embodiment, the remaining toner amount that can be detected is 20% to 0%. This is because the third and fourth embodiments are configured so that the toner amount in the measurement area does not change until the remaining toner amount drops to 20%. The remaining toner amount which is around 0% can be detected with high precision by placing the antenna member 43 close to the developing sleeve 41. However, the remaining toner amount measurement area may become smaller in this case. In order to start remaining toner amount detection from an earlier stage where the remaining toner amount is larger while maintaining the precision in the detection of the remaining toner amount around 0%, expanding the measurement area by the antenna member 43 is desired.

A method of expanding the remaining toner amount measurement area that has been used in the past is to stick a plurality of (two, for example) antenna members 43 which are formed from SUS sheet metal or the like to the developer container 46 with double-sided adhesive tape or the like, as in Comparative Example 6 (FIG. 25A) which will be described later. Each antenna member 43 is connected separately to a capacitance detecting circuit in this case. In this configuration, however, the distance tolerance described in the third embodiment is brought into the equation by each antenna member 43 stuck to the developer container 46, and causes the remaining toner amount detection result to vary. Sticking a plurality of (two, for example) antenna members 43 also requires more steps of manufacturing the developer container 46 and higher cost than in, for example, Comparative Example 5.

Figure 24A:
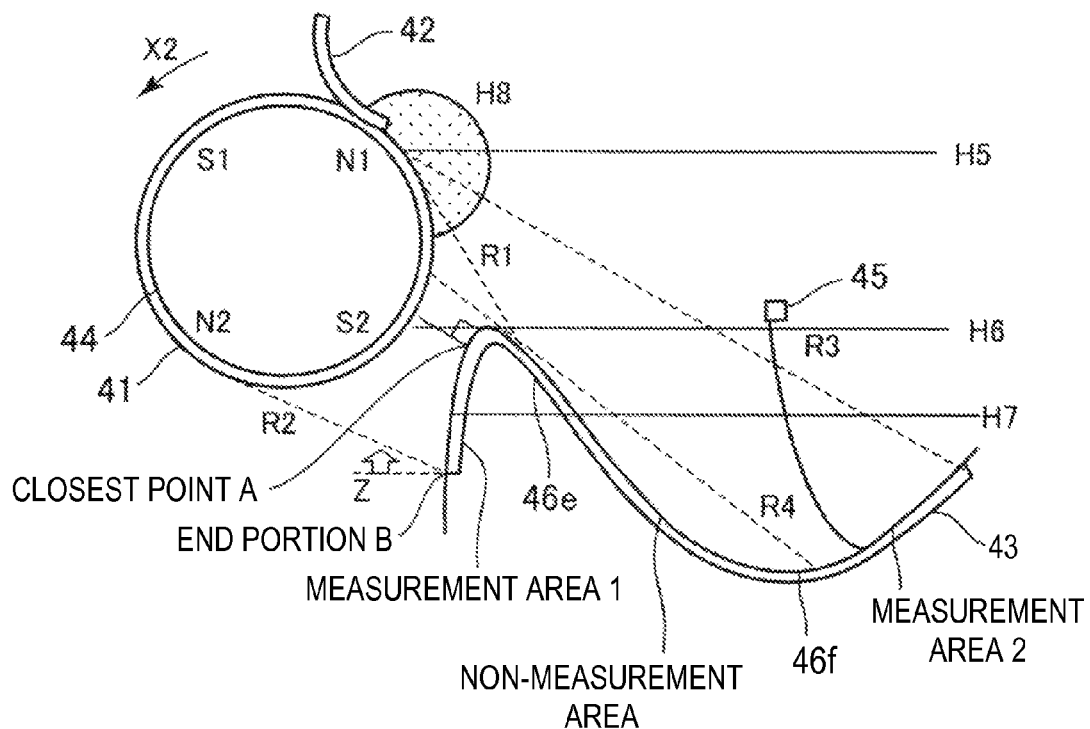
FIG. 24A is a schematic sectional view of a substantial part of a developing apparatus according to a fifth embodiment.

FIG. 24A is a schematic sectional view of a part of the developing apparatus 4 according to the fifth embodiment which is in the vicinity of the antenna member 43. The antenna member 43 in the fifth embodiment is sequentially arranged in the convex portion 46e to the concave portion 46f, which is formed on the bottom of the developer containing portion 40a. This gives the antenna member 43 two surfaces, a measurement area 1 and a measurement area 2, as measurement areas which are opposed to the developing sleeve 41 and in which the capacitance can be measured. The antenna member 43 also has one surface as a non-measurement area which is located between the convex portion 46e and the concave portion 46f and behind the convex portion 46e with respect to the developing sleeve 41 and in which the capacitance cannot be measured. The antenna member 43 in the fifth embodiment thus has at least one convex portion 46e protruding toward the developing sleeve 41 (toward the first electrode), and the closest point A is located in the convex portion 46e. The antenna member 43 in the fifth embodiment also has at least one concave portion 46f which is opposite to the developing sleeve 41 with respect to the convex portion 46e. The single antenna member 43 thus forms a plurality of surfaces which are opposed to the developing sleeve 41.

Specifically, a broken line R1 in FIG. 24A is a tangent line of the developing sleeve 41 that runs through a point where a boundary line R4 of an area behind the convex portion 46e with respect to the developing sleeve 41 is in contact with the antenna member 43 on the side of the developing sleeve 41 (in the vicinity of the peak of the convex portion 46e). A broken line R2 is a tangent line of the developing sleeve 41 that runs through the end portion B of the antenna member 43 on the side of the developing sleeve 41. An area surrounded by the broken line 1, the broken line 2, the surface of the developing sleeve 41, and one of the surfaces of the antenna member 43 is the remaining toner amount measurement area 1. A broken line R3 in FIG. 24A is a tangent line of the developing sleeve 41 that runs through an end portion of the antenna member 43 which is on the side opposite to the developing sleeve 41. A broken line R4 is the boundary line of the area behind the convex portion 46e with respect to the developing sleeve 41. An area surrounded by the broken line R3, the broken line R4, the surface of the developing sleeve 41, and one of the surfaces of the antenna member 43 is the remaining toner amount measurement area 2. An area in FIG. 24A which is enclosed by a surface of the antenna member 43 and the broken line R4 is the non-measurement area where the remaining toner amount is not measured.

Figure 24B:
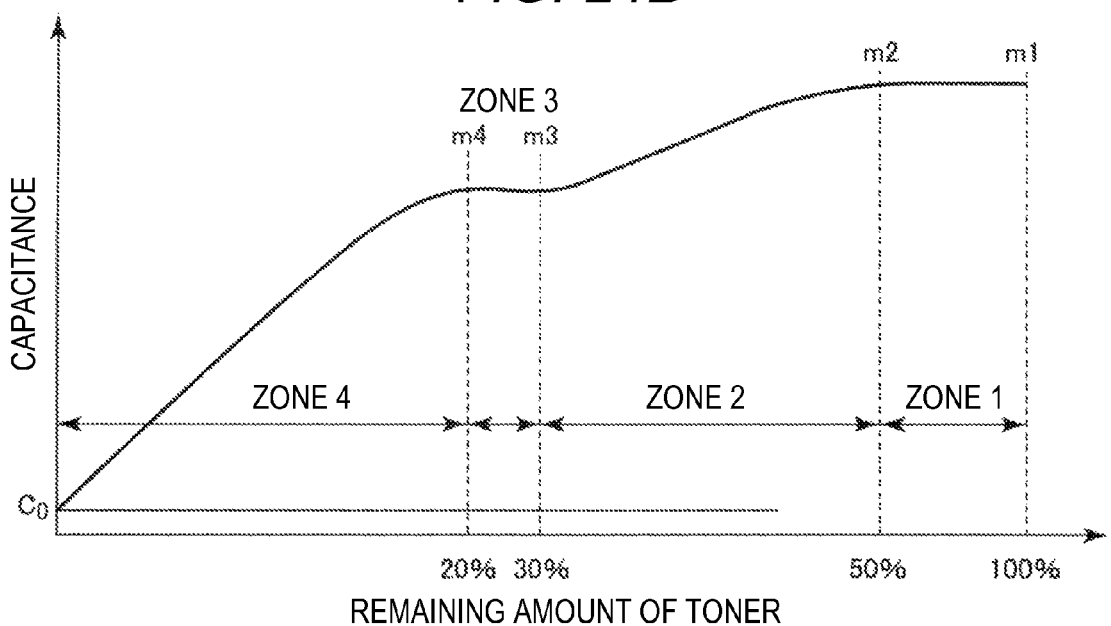
FIG. 24B is a graph showing an example of a relation between the remaining toner amount and the capacitance.

FIG. 24B shows a relation between the remaining toner amount and the capacitance which is obtained in advance in the configuration of the fifth embodiment in the manner described above. The axis of abscissa indicates the remaining toner amount and the axis of ordinate indicates the detected capacitance. The capacitance which is detected when the remaining toner amount is 0% and an image with a blank area is generated is represented by $C_0$.

In FIG. 24B, the capacitance is constant irrespective of the remaining toner amount in the zone 1 where the remaining toner amount is m1 to m2. The toner surface level in this zone is at H5 in FIG. 24A. The toner surface level is above H5 when the process cartridge 120 is new, and gradually shifts to H5 as the toner is consumed by forming images. Until the toner surface level reaches H5, each measurement area is filled with the toner and the capacitance is therefore constant irrespective of the remaining toner amount. This zone is where the remaining toner amount is 100% to 50% in the fifth embodiment.

Next, the capacitance decreases with the reduction of the remaining toner amount in a zone 2 of FIG. 24B where the remaining toner amount is m2 to m3. The toner surface level in this zone is between H5 and H6 in FIG. 24A. When the toner surface level is between H5 and H6, the toner amount changes in the measurement area 2, and changes in capacitance in the zone 2 are therefore dominated by results of detection in the measurement area 2. This zone is where the remaining toner amount is 50% to 30% in the fifth embodiment.

Next, in FIG. 24B, the capacitance is constant again irrespective of the remaining toner amount in the zone 3 where the remaining toner amount is m3 to m4. The toner surface level in this zone is, for example, at H7 in FIG. 24A. When the toner is in the non-measurement area, the toner amount in the area cannot be measured and the capacitance is therefore constant irrespective of the remaining toner amount. This zone is where the remaining toner amount is 30% to 20% in the fifth embodiment.

When the toner surface level is between H5 and H7, the vicinity of the developing sleeve 41 is substantially filled with the toner fed from the agitating member 45, and the result of detection in the measurement area 1 does not change much.

Next, in a zone 4 of FIG. 24B where the remaining toner amount is m4 to 0%, the remaining toner amount and the capacitance have a linear relation again. The toner surface level in this zone changes in the manner described in the third embodiment with reference to FIG. 20B. Specifically, the toner surface level changes from H7 to H8 of FIG. 24A. While the toner surface level changes from H7 to H8, the toner amount in the measurement area 1 changes, and changes in capacitance in the zone 4 are therefore dominated by results of detection in the measurement area 1. This zone is where the remaining toner amount is 20% to 0% in the fifth embodiment.

Configuration of Comparative Example 6

Figure 25A:
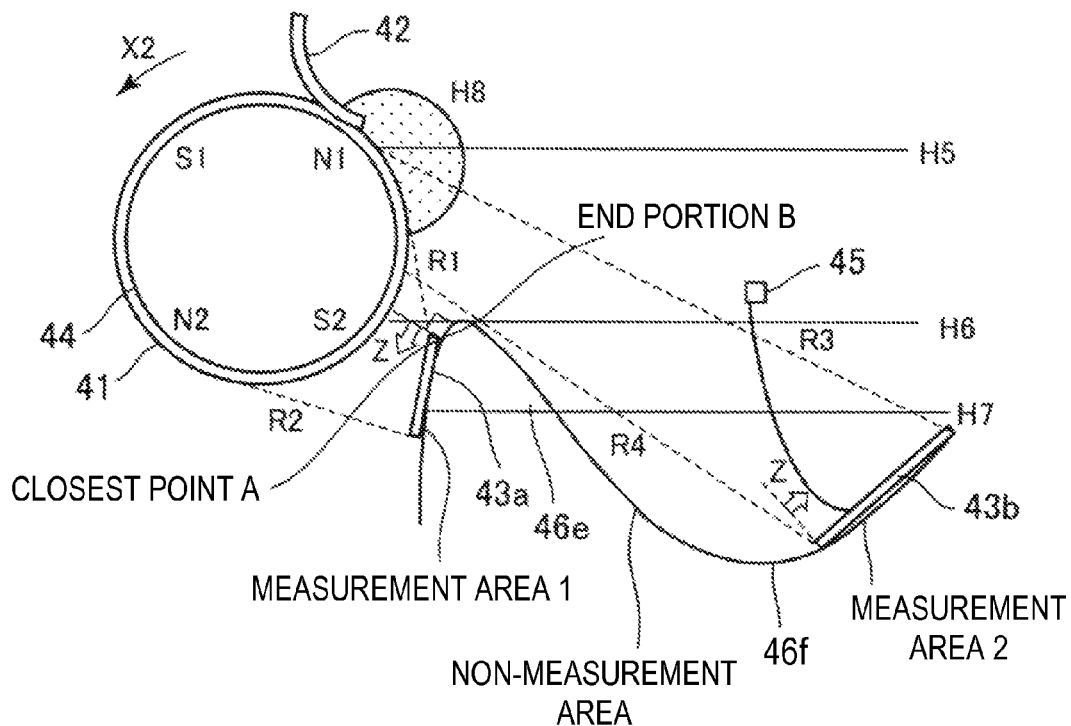
FIG. 25A is a schematic sectional view of a substantial part of a developing apparatus according to Comparative Example 6.

FIG. 25A is a schematic sectional view of a part of the developing apparatus 4 according to Comparative Example 6 which is in the vicinity of the antenna member 43. The configuration of Comparative Example 6 is substantially the same as that of the fifth embodiment, except for points specifically noted below. In Comparative Example 6, two antenna members are provided which are a first antenna member 43a and a second antenna member 43b, and which are made from SUS sheet metal. The first antenna member 43a and the second antenna member 43b are each arranged so as to face the developing sleeve 41. In order to detect the remaining toner amount in a wider range than in Comparative Example 5 described above, the first antenna member 43a is arranged in the vicinity of the developing sleeve 41 and the second antenna member 43b is arranged at a distance from the developing sleeve 41. In each of the first antenna member 43a and the second antenna member 43b, the closest point A to the developing sleeve 41 and the end portion B on the side of the developing sleeve 41 coincide with each other. The first antenna member 43a and the second antenna member 43b are connected to the same electric potential and are connected to an earth via the capacitance detecting circuit 132.

Evaluation of Fifth Embodiment and Comparative Example 6

The fifth embodiment and Comparative Example 6 were evaluated in the same manner as in the third embodiment. In the fifth embodiment illustrated in FIG. 24A and Comparative Example 6 illustrated in FIG. 25A, the end portion B of the antenna member 43 on the side of the developing sleeve 41 was reduced in size in a direction indicated by an arrow Z of the drawing (toward the other end portion of the antenna member 43), thereby changing the position of the end portion B by 2 mm). The influence of position precision on the precision of remaining toner amount detection was then evaluated.

In Comparative Example 6, the position of the end portion B on the side of the developing sleeve 41 was changed by 2 mm in the manner described above in each of the first antenna member 43a and the second antenna member 43b.

Figure 24C:
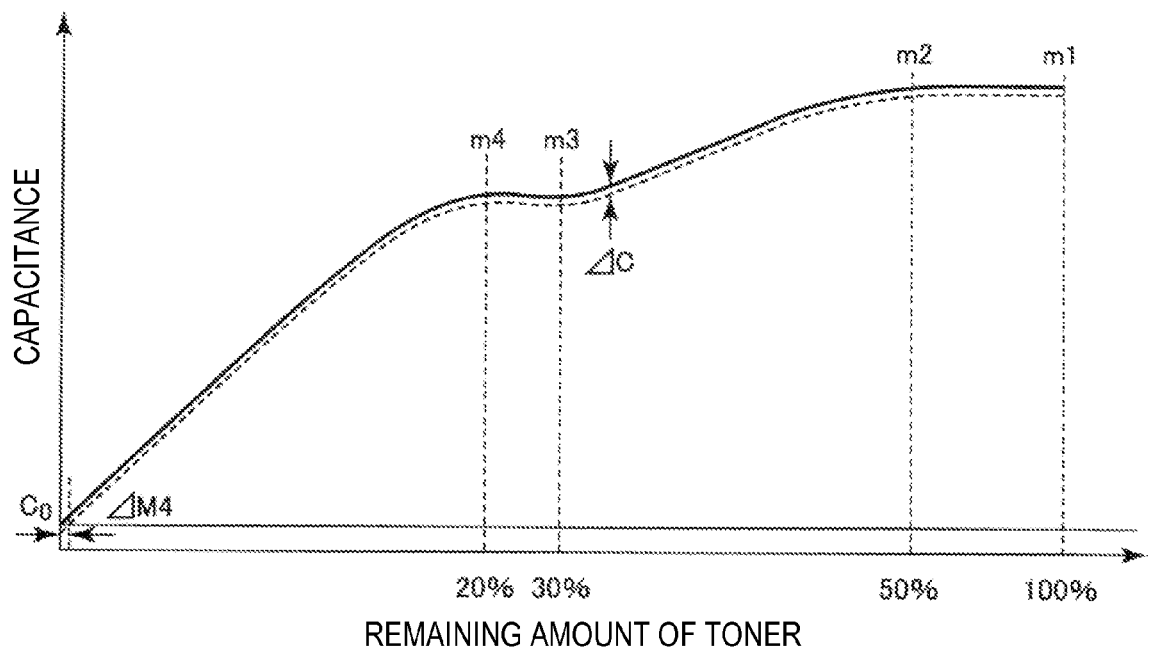
FIG. 24C is a graph illustrating a relation between transitions of the capacitance detection result and the position of an antenna member.
Figure 25B:
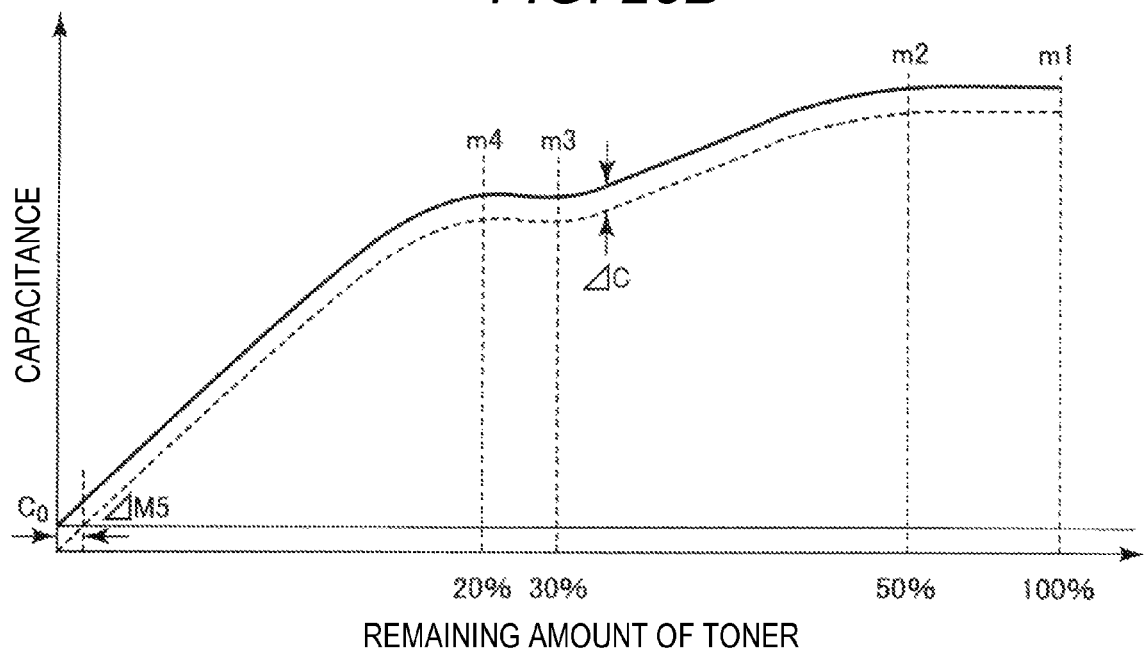
FIG. 25B is a graph illustrating a relation between transitions of the capacitance detection result and the position of an antenna member.

FIG. 24C shows a relation between the amount of toner actually remaining in the developer container 46 and the detected capacitance in the configuration of the fifth embodiment. FIG. 25B shows a relation between the amount of toner actually remaining in the developer container 46 and the detected capacitance in the configuration of Comparative Example 6. The solid line in FIG. 24C represents a remaining toner amount-capacitance relation in the fifth embodiment where the antenna member 43 is arranged as illustrated in FIG. 24A. The solid line in FIG. 25B represents a remaining toner amount-capacitance relation in Comparative Example 6 where the antenna member 43 is arranged as illustrated in FIG. 25A. In each of FIG. 24C and FIG. 25B, the broken line indicates a relation between the remaining toner amount and the capacitance when the position of the antenna member 43 on the end portion B side is shifted by 2 mm in the manner described above.

It is understood from FIG. 24C and FIG. 25B that shifting the position of the end portion B of the antenna member 43 made the capacitance detected in relation to the actual remaining toner amount smaller. The differential (amount of change) $\Delta C$ between the solid line and the broken line in the fifth embodiment shown in FIG. 24C is compared to the differential $\Delta C$ between the solid line and the broken line in Comparative Example 6 shown in FIG. 25B to reveal that the differential $\Delta C$ in Comparative Example 6 is larger. The differential $\Delta C$ is larger in Comparative Example 6 than in the fifth embodiment for Reason 1, Reason 2, and Reason 3 given above.

The differential $\Delta C$ in the fifth embodiment is thus smaller than in Comparative Example 6. As a result, the differential $\Delta M$ in the amount of toner that remains upon detection of the capacitance $C_0$, which is when an image with a blank area is generated, is smaller in the fifth embodiment at $\Delta M4$ than in Comparative Example 6, where the differential $\Delta M$ is $\Delta M5$.

According to the fifth embodiment, the same effects as those of the third embodiment and the fourth embodiment are obtained. In addition, the remaining toner amount can be indicated sequentially from an early stage where the remaining toner amount is large by increasing the number of antenna members or the like, without furthering the lowering of the precision in remaining toner amount detection.

According to the embodiments disclosed herein, the developer container of which the developer amount is detected by the capacitance detection method is manufactured easily. The developer container, the developing apparatus, and the process cartridge according to the embodiments disclosed herein can improve detection precision when the developer amount is detected by the capacitance detection method with the use of a conductive resin member as an electrode.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-146567, filed Jul. 12, 2013, Japanese Patent Application No. 2013-197570, filed Sep. 24, 2013, Japanese Patent Application No. 2013-197563, filed Sep. 24, 2013, Japanese Patent Application No. 2014-113492, filed May 30, 2014, Japanese Patent Application No. 2013-146569, filed Jul. 12, 2013, and Japanese Patent Application No. 2014-125611, filed Jun. 18, 2014, which are hereby incorporated by reference herein in their entirety.

What is claimed is:

1. A developer container configured to contain a developer, the developer container comprising an antenna member configured to detect a developer amount by use of a capacitance, wherein the antenna member comprises a conductive resin member having a resistance of $10^3 \Omega$ or more and $10^5 \Omega$ or less.

2. The developer container according to claim 1, comprising a plurality of conductive resin members, the developer amount being detected by use of the capacitance between the plurality of conductive resin members.

3. The developer container according to claim 1, wherein the conductive resin member is nonmagnetic or diamagnetic.

4. A developing apparatus, comprising:
a developer container as recited in claim 1; and
a developer carrying member configured to carry and convey a developer.

5. The developing apparatus according to claim 4, wherein the developer carrying member serves as the first electrode.

6. A process cartridge detachably mountable to a main body of an image forming apparatus, the process cartridge comprising:
a developer container as recited in claim 1; and
an image bearing member on which an electrostatic image is to be formed.

7. An image forming apparatus in which an electrostatic image is developed with a developer into a developer image, the developer image is transferred to a recording material, and the recording material is output, the image forming apparatus comprising:
a developer container as recited in claim 1; and
an image bearing member on which an electrostatic image is to be formed.

8. The developer container according to claim 1, further comprising a first electrode,
wherein the conductive resin member has at least one convex portion protruding toward the first electrode, and
wherein the conductive resin member has at least one concave portion opposite to the first electrode with respect to the at least one convex portion, and a single conductive resin member forms a plurality of surfaces opposed to the first electrode.

9. The developer container according to claim 1, wherein the conductive resin member has a curved surface.

10. A developer container, comprising:
a frame configured to define a developer containing portion;
a first electrode; and
a second electrode which is arranged on a surface of the frame and which has a surface opposed to the first electrode,
wherein a developer amount in the developer containing portion is detected based on a capacitance between the first electrode and the second electrode,
the second electrode is constituted by a conductive resin member,
a closest point, in which the second electrode is closest to the first electrode, on the second electrode is located in a position other than an end portion of the second electrode as viewed along an axial direction of the first electrode,
the second electrode has at least one convex portion protruding toward the first electrode, and
the closest point is located on the at least one convex portion.

11. The developer container according to claim 10, wherein the second electrode has at least one concave portion opposite to the first electrode with respect to the at least one convex portion, and a single second electrode forms a plurality of surfaces opposed to the first electrode.

12. The developer container according to claim 10, wherein the conductive resin member has a curved surface.

13. The developer container according to claim 10, wherein the conductive resin member is nonmagnetic or diamagnetic.

14. A developing apparatus, comprising:
a developer container as recited in claim 10; and
a developer carrying member configured to carry and convey a developer.

15. The developing apparatus according to claim 14, wherein the developer carrying member serves as the first electrode.

16. A process cartridge detachably mountable to a main body of an image forming apparatus, the process cartridge comprising:
a developer container as recited in claim 10; and
an image bearing member on which an electrostatic image is to be formed.

17. An image forming apparatus in which an electrostatic image is developed with a developer into a developer image, the developer image is transferred to a recording material, and the recording material is output, the image forming apparatus comprising:
a developer container as recited in claim 10; and
an image bearing member on which an electrostatic image is to be formed.

* * * * *